US011861319B2

(12) United States Patent
Galitsky et al.

(10) Patent No.: US 11,861,319 B2
(45) Date of Patent: *Jan. 2, 2024

(54) CHATBOT CONDUCTING A VIRTUAL SOCIAL DIALOGUE

(71) Applicant: Oracle International Corporation, Redwood Shores, CA (US)

(72) Inventors: Boris Galitsky, San Jose, CA (US); Andrey Ozerov, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/706,155

(22) Filed: Mar. 28, 2022

(65) Prior Publication Data
US 2022/0222444 A1 Jul. 14, 2022

Related U.S. Application Data

(63) Continuation of application No. 16/789,840, filed on Feb. 13, 2020, now Pat. No. 11,321,536.
(Continued)

(51) Int. Cl.
*G06F 40/35* (2020.01)
*G06F 16/332* (2019.01)
(Continued)

(52) U.S. Cl.
CPC .......... *G06F 40/35* (2020.01); *G06F 16/3329* (2019.01); *G06F 18/22* (2023.01);
(Continued)

(58) Field of Classification Search
CPC ...... G06F 40/35; G06F 16/3329; G06F 18/22; G06F 18/23; G06F 40/279; G06F 40/30;
(Continued)

(56) References Cited

U.S. PATENT DOCUMENTS 5,495,605 A 2/1996 Cadot
5,694,523 A * 12/1997 Wical .................... G06F 40/253
706/45

(Continued)

OTHER PUBLICATIONS

S. Vazquez-Reyes and W. J. Black, "Evaluating Causal Questions for Question Answering," 2008 Mexican International Conference on Computer Science, Mexicali, Mexico, 2008, pp. 132-142, doi: 10.1109/ENC.2008.14. (Year: 2008).*

(Continued)

*Primary Examiner* — Bharatkumar S Shah
(74) *Attorney, Agent, or Firm* — Kilpatrick Townsend & Stockton LLP

(57) ABSTRACT

Improved techniques for dialogue management are disclosed. In particular, disclosed systems facilitate improved autonomous agents that can generate a virtual social dialogue from a corpus of text. A virtual social dialogue is a dialogue between autonomous agents and user devices. For example, a virtual social dialogue can include viewpoints, concerns, or questions of various actors on a particular topic. By presenting textual content in this manner, disclosed techniques improve information comprehension and increase the practicality of autonomous agents.

18 Claims, 20 Drawing Sheets

Related U.S. Application Data

(60) Provisional application No. 62/804,977, filed on Feb. 13, 2019.

(51) Int. Cl.

| | | |
|---|---|---|
| *G06F 40/279* | (2020.01) | |
| *H04L 51/02* | (2022.01) | |
| *G06F 18/22* | (2023.01) | |
| *G06F 18/23* | (2023.01) | |
| *G06V 10/74* | (2022.01) | |
| *G06V 10/762* | (2022.01) | |
| *G06V 10/70* | (2022.01) | |

(52) U.S. Cl.
CPC ............ *G06F 18/23* (2023.01); *G06F 40/279* (2020.01); *G06V 10/761* (2022.01); *G06V 10/762* (2022.01); *G06V 10/768* (2022.01); *H04L 51/02* (2013.01)

(58) Field of Classification Search
CPC .. G06V 10/761; G06V 10/762; G06V 10/768; H04L 51/02; H04L 51/52
USPC .......................................................... 704/9
See application file for complete search history.

(56) References Cited

U.S. PATENT DOCUMENTS

| | | | | |
|---|---|---|---|---|
| 5,708,822 A * | 1/1998 | Wical | .................... | G06F 40/253 |
| | | | | 715/256 |
| 6,061,675 A * | 5/2000 | Wical | .................... | G06F 40/268 |
| | | | | 706/45 |
| 6,279,476 B1 | 8/2001 | Ellis | | |
| 6,487,545 B1 * | 11/2002 | Wical | .................... | G06F 40/289 |
| | | | | 706/45 |
| 6,598,054 B2 * | 7/2003 | Schuetze | ............... | G06F 16/904 |
| | | | | 345/650 |
| 6,731,307 B1 | 5/2004 | Strubbe et al. | | |
| 6,922,699 B2 * | 7/2005 | Schuetze | ............... | G06F 16/5838 |
| | | | | 707/E17.022 |
| 6,941,321 B2 * | 9/2005 | Schuetze | ............... | G06F 16/355 |
| 7,027,975 B1 | 4/2006 | Pazandak et al. | | |
| 7,152,031 B1 | 12/2006 | Jensen et al. | | |
| 7,519,529 B1 | 4/2009 | Horvitz | | |
| 7,634,462 B2 * | 12/2009 | Weyand | ............... | G06F 16/3338 |
| | | | | 707/999.005 |
| 7,752,220 B2 * | 7/2010 | Weyand | ............... | G06F 16/3331 |
| | | | | 707/719 |
| 7,756,855 B2 * | 7/2010 | Ismalon | ............... | G06F 16/3322 |
| | | | | 707/713 |
| 7,840,556 B1 | 11/2010 | Dayal et al. | | |
| 7,991,841 B2 | 8/2011 | Anderson et al. | | |
| 8,108,406 B2 * | 1/2012 | Kenedy | ............... | G06F 16/9535 |
| | | | | 707/750 |
| 8,166,032 B2 | 4/2012 | Sommer et al. | | |
| 8,429,184 B2 * | 4/2013 | Ismalon | .................. | G06F 16/40 |
| | | | | 707/765 |
| 8,452,225 B2 * | 5/2013 | Burstein | .................. | G09B 7/00 |
| | | | | 434/353 |
| 8,630,972 B2 | 1/2014 | Gamon et al. | | |
| 8,903,810 B2 * | 12/2014 | Ismalon | ............... | G06F 16/9535 |
| | | | | 707/723 |
| 8,935,151 B1 | 1/2015 | Petrov et al. | | |
| 9,037,464 B1 | 5/2015 | Mikolov et al. | | |
| 9,147,397 B2 * | 9/2015 | Thomsen | ............ | G10L 19/0204 |
| 9,183,288 B2 * | 11/2015 | Murray | ................. | G06F 16/358 |
| 9,240,128 B2 * | 1/2016 | Bagchi | .................... | G09B 7/00 |
| 9,292,490 B2 | 3/2016 | Kimelfeld et al. | | |
| 9,449,080 B1 * | 9/2016 | Zhang | ................. | G06F 16/3346 |
| 9,563,693 B2 | 2/2017 | Zhang et al. | | |
| 9,830,913 B2 * | 11/2017 | Thomsen | ............... | H04R 3/005 |
| 10,120,864 B2 * | 11/2018 | Sandor | ............... | G06F 16/353 |
| 10,437,833 B1 * | 10/2019 | Nguyen | ................. | G06N 5/046 |
| 10,585,927 B1 | 3/2020 | Liao et al. | | |
| 10,592,606 B2 | 3/2020 | Kuo et al. | | |
| 10,594,757 B1 | 3/2020 | Shevchenko et al. | | |
| 10,839,158 B2 * | 11/2020 | Ji | .......................... | G06F 40/289 |
| 11,023,774 B2 * | 6/2021 | Nefedov | ................. | G06F 18/23 |
| 11,068,479 B2 | 7/2021 | Sidar et al. | | |
| 11,562,135 B2 | 1/2023 | Galitsky | | |
| 2001/0053968 A1 | 12/2001 | Galitsky et al. | | |
| 2002/0046018 A1 * | 4/2002 | Marcu | ..................... | G06F 40/44 |
| | | | | 704/9 |
| 2004/0044519 A1 * | 3/2004 | Polanyi | .................. | G06F 40/35 |
| | | | | 707/E17.058 |
| 2004/0083092 A1 | 4/2004 | Valles | | |
| 2005/0005266 A1 * | 1/2005 | Datig | ........................ | G06N 5/02 |
| | | | | 717/136 |
| 2006/0136352 A1 | 6/2006 | Brun et al. | | |
| 2007/0073533 A1 | 3/2007 | Thione et al. | | |
| 2007/0185859 A1 | 8/2007 | Flowers et al. | | |
| 2007/0208732 A1 | 9/2007 | Flowers et al. | | |
| 2007/0294229 A1 | 12/2007 | Au | | |
| 2008/0091408 A1 | 4/2008 | Roulland et al. | | |
| 2008/0114750 A1 | 5/2008 | Saxena et al. | | |
| 2008/0172409 A1 | 7/2008 | Botros et al. | | |
| 2008/0228467 A1 | 9/2008 | Womack et al. | | |
| 2009/0089252 A1 | 4/2009 | Galitsky et al. | | |
| 2009/0248399 A1 | 10/2009 | Au | | |
| 2009/0282019 A1 | 11/2009 | Galitsky et al. | | |
| 2010/0169352 A1 | 7/2010 | Flowers et al. | | |
| 2011/0078167 A1 | 3/2011 | Sundaresan et al. | | |
| 2011/0270774 A1 | 11/2011 | Varshavsky et al. | | |
| 2012/0041950 A1 | 2/2012 | Koll et al. | | |
| 2012/0078902 A1 | 3/2012 | Duboue et al. | | |
| 2012/0166180 A1 * | 6/2012 | Au | ........................ | G06F 40/237 |
| | | | | 704/9 |
| 2012/0177296 A1 * | 7/2012 | Ren | ........................ | H04N 19/33 |
| | | | | 382/218 |
| 2012/0179752 A1 | 7/2012 | Mosley et al. | | |
| 2012/0189212 A1 * | 7/2012 | Ren | ........................ | G06F 16/783 |
| | | | | 382/218 |
| 2012/0240185 A1 | 9/2012 | Kapoor et al. | | |
| 2013/0073571 A1 | 3/2013 | Coulet et al. | | |
| 2013/0124529 A1 | 5/2013 | Jacob | | |
| 2013/0191416 A1 | 7/2013 | Lee et al. | | |
| 2013/0268532 A1 * | 10/2013 | Doshi | ................... | G06F 16/285 |
| | | | | 707/737 |
| 2014/0040288 A1 | 2/2014 | Galitsky | | |
| 2014/0122083 A1 | 5/2014 | Xiaojiang | | |
| 2014/0136188 A1 | 5/2014 | Wroczynski et al. | | |
| 2014/0229164 A1 | 8/2014 | Martens et al. | | |
| 2014/0337257 A1 | 11/2014 | Chatterjee et al. | | |
| 2015/0051900 A1 | 2/2015 | Kimelfeld et al. | | |
| 2015/0081296 A1 * | 3/2015 | Lee | .......................... | G10L 15/22 |
| | | | | 704/251 |
| 2015/0112664 A1 * | 4/2015 | Srinivasan | ............... | G06F 40/30 |
| | | | | 704/9 |
| 2015/0120299 A1 * | 4/2015 | Thomsen | ................. | G10L 15/22 |
| | | | | 704/246 |
| 2015/0161512 A1 | 6/2015 | Byron et al. | | |
| 2016/0034457 A1 | 2/2016 | Bradley et al. | | |
| 2016/0063993 A1 | 3/2016 | Dolan et al. | | |
| 2016/0064001 A1 * | 3/2016 | Thomsen | ................. | H04R 3/005 |
| | | | | 704/246 |
| 2016/0099892 A1 | 4/2016 | Palakovich et al. | | |
| 2016/0148227 A1 | 5/2016 | Choe et al. | | |
| 2016/0232152 A1 | 8/2016 | Mahamood | | |
| 2016/0247068 A1 | 8/2016 | Lin | | |
| 2017/0011029 A1 | 1/2017 | Chatterjee et al. | | |
| 2017/0034107 A1 | 2/2017 | Krishnaswamy et al. | | |
| 2017/0116982 A1 | 4/2017 | Gelfenbeyn et al. | | |
| 2017/0161372 A1 | 6/2017 | Fernández et al. | | |
| 2017/0192955 A1 | 7/2017 | Zeichner et al. | | |
| 2017/0193397 A1 | 7/2017 | Kottha et al. | | |
| 2017/0235830 A1 | 8/2017 | Smith et al. | | |
| 2017/0249389 A1 | 8/2017 | Brovinsky et al. | | |
| 2018/0025303 A1 | 1/2018 | Janz | | |
| 2018/0107457 A1 | 4/2018 | Barad et al. | | |
| 2018/0189385 A1 | 7/2018 | Sun et al. | | |
| 2018/0232443 A1 | 8/2018 | Delgo et al. | | |

(56) References Cited

U.S. PATENT DOCUMENTS

| | | | |
|---|---|---|---|
| 2018/0336183 A1 | 11/2018 | Lee et al. | |
| 2018/0373701 A1 | 12/2018 | McAteer et al. | |
| 2019/0005027 A1* | 1/2019 | He | G06F 40/35 |
| 2019/0124023 A1 | 4/2019 | Conroy et al. | |
| 2019/0135304 A1 | 5/2019 | Kim et al. | |
| 2019/0156125 A1* | 5/2019 | Massoudifar | G06N 3/044 |
| 2019/0163756 A1 | 5/2019 | Bull et al. | |
| 2019/0182342 A1 | 6/2019 | Goenka et al. | |
| 2019/0182382 A1* | 6/2019 | Mazza | G10L 15/26 |
| 2019/0311036 A1* | 10/2019 | Shanmugam | G06F 40/56 |
| 2019/0354544 A1 | 11/2019 | Hertz et al. | |
| 2020/0004816 A1 | 1/2020 | Kieser et al. | |
| 2020/0027446 A1 | 1/2020 | Ture et al. | |
| 2020/0065398 A1 | 2/2020 | Shriber et al. | |
| 2020/0082415 A1 | 3/2020 | LaTerza | |
| 2020/0286463 A1 | 9/2020 | Galitsky | |
| 2021/0081607 A1 | 3/2021 | Mitsuda et al. | |
| 2021/0110895 A1 | 4/2021 | Shriberg et al. | |
| 2021/0357585 A1 | 11/2021 | Surdeanu et al. | |
| 2022/0020230 A1* | 1/2022 | Tal | G06V 20/56 |

OTHER PUBLICATIONS

S. Vazquez-Reyes and W. J. Black, "Evaluating Causal Questions for Question Answering," 2008 Mexican International Conference on Computer Science, Mexicali, Mexico, 2008, pp. 132-142, doi: 10.1109/ENC.2008.14. (Year: 2008) (Year: 2008).*
S. Vazquez-Reyes and W. J. Black, "Evaluating Causal Questions for Question Answering," 2008 Mexican International Conference on Computer Science, Mexicali, Mexico, 2008, pp. 132-142, doi: 10.1109/ENC.2008.14. (Year: 2008) (Year: 2008) (Year: 2008).*
S. K. Ray and K. Shaalan, "A Review and Future Perspectives of Arabic Question Answering Systems," in IEEE Transactions on Knowledge and Data Engineering, vol. 28, No. 12, pp. 3169-3190, Dec. 1, 2016, doi: 10.1109/TKDE.2016.2607201. (Year: 2016).*
AI Marketing, Chatbots, and Your CMS, Available Online at: https://simplea.com/Articles/AI-Marketing-Chatbots-and-Your-CMS, Accessed from Internet on Nov. 19, 2019, pp. 1-9.
Exploring Dialog Management for Bots, Chatbots Magazine, Available Online at: https://chatbotsmagazine.com/exploring-dialog-management-for-bots-cbb8665a2fd3, Jul. 11, 2016, 7 pages.
Get Search Results Faster, Google Search Help, Available Online at https://support.google.com/websearch/answer/106230, Accessed from Internet at Nov. 19, 2019, pp. 1-2.
U.S. Appl. No. 16/240,232, Final Office Action dated Oct. 21, 2021, 13 pages.
U.S. Appl. No. 16/240,232, Non-Final Office Action dated Apr. 9, 2021, 13 pages.
U.S. Appl. No. 16/240,232, Non-Final Office Action dated Jan. 4, 2022, 15 pages.
U.S. Appl. No. 16/654,258, Non-Final Office Action dated Feb. 17, 2022, 33 pages.
U.S. Appl. No. 16/789,840, Non-Final Office Action dated Oct. 1, 2021, 26 pages.
U.S. Appl. No. 16/789,840, Notice of Allowance dated Feb. 7, 2022, 17 pages.
U.S. Appl. No. 16/654,258, Non-Final Office Action dated May 27, 2022, 29 pages.
Aleman-Meza et al., Context-Aware Semantic Association Ranking, Proceedings of the First International Conference on Semantic Web and Databases, Sep. 7-8, 2003, pp. 24-41.
Alsinet et al., A Logic Programming Framework for Possibilistic Argumentation: Formalization and Logical Properties, Fuzzy Sets and Systems, vol. 159, No. 10, May 16, 2008, pp. 1208-1228.
Altinel et al., A Corpus-Based Semantic Kernel for Text Classification by Using Meaning Values of Terms, Engineering Applications of Artificial Intelligence, vol. 43, Aug. 2015, pp. 54-66.
An Vo, FBK-HLT: A New Framework for Semantic Textual Similarity, Proceedings of the 9th International Workshop on Semantic Evaluation (SemEval 2015), Jun. 2015, pp. 102-106.

Antoniou et al., Representation Results for Defeasible Logic, Association for Computing Machinery Transactions on Computational Logic, vol. 2, No. 2, Apr. 2001, pp. 255-287.
Banerjee et al., WikiWrite: Generating Wikipedia Articles Automatically, Proceedings of the Twenty-Fifth International Joint Conference on Artificial Intelligence (IJCAI-16), Jul. 2016, pp. 2740-2746.
Banko et al., Open Information Extraction from the Web, In Proceedings of the Twentieth International Joint Conference on Artificial Intelligence, Jan. 6-12, 2007, pp. 2670-2676.
Baralis et al., Generalized Association Rule Mining with Constraints, Information Sciences, vol. 194, Jul. 2012, pp. 68-84.
Bar-Haim et al., Semantic Inference at the Lexical-Syntactic Level, Proceedings of Association for the Advancement of Artificial Intelligence, Jul. 2007, pp. 871-876.
Baroni et al., Cleaneval: A Competition for Cleaning Web Pages, Proceedings of the Sixth International Conference on Language Resources and Evaluation, May 2008, pp. 638-643.
Blei et al., Latent Dirichlet Allocation, Journal of Machine Learning Research, vol. 3, Jan. 2003, pp. 993-1022.
Boltuzic et al., Back up your Stance: Recognizing Arguments in Online Discussions, Proceedings of the First Workshop on Argumentation Mining, Jun. 26, 2014, pp. 49-58.
Bordini et al., A Survey of Programming Languages and Platforms for Multi-Agent Systems, Informatica, vol. 30, No. 1, Jan. 2006, pp. 33-44.
Bron et al., Algorithm 457: Finding All Cliques of an Undirected Graph, Communications of the ACM, vol. 16, No. 9, Sep. 1973, pp. 575-579.
Brzezinski et al., Accuracy Updated Ensemble for Data Streams with Concept Drift, International Conference on Hybrid Artificial Intelligence Systems, vol. 6679, May 23-25, 2011, pp. 155-163.
Bunke, Graph-Based Tools for Data Mining and Machine Learning, Lecture Notes in Computer Science, vol. 2734, Jan. 2003, pp. 7-19.
Cai et al., Extracting Content Structure for Web Pages Based on Visual Representation, LNCS, vol. 2642, Springer, Apr. 2003, 12 pages.
Cardie et al., Guest Editor's Introduction: Machine Learning and Natural Language, Machine Learning, vol. 1, No. 5, Feb. 1999, pp. 1-5.
Carreras et al., Introduction to the CoNLL-2004 Shared Task: Semantic Role Labeling, Proceedings of the Eighth Conference on Computational Natural Language Learning, Association for Computational Linguistics, May 6-7, 2004, pp. 89-97.
Carstens et al., Using Argumentation to Improve Classification in Natural Language Problems, Association for Computing Machinery Transactions on Internet Technology, vol. 17, No. 3, Jul. 2017, 23 pages.
Chakrabarti et al., Graph Mining: Laws, Generators, and Algorithms, ACM Computing Surveys, vol. 38, No. 1, Mar. 2006, pp. 69-123.
Chesnevar et al., Empowering Recommendation Technologies Through Argumentation, Argumentation in Artificial Intelligence, May 2009, pp. 403-422.
Cox et al., Vicarious Learning from Dialogue and Discourse: A Controlled Comparison, Instructional Science, vol. 27, Nov. 1999, pp. 431-458.
Craig et al., Overhearing Dialogues and Monologues in Virtual Tutoring Sessions: Effects on Questioning and Vicarious Learning, International Journal of Artificial Intelligence in Education, vol. 11, Jan. 2000, pp. 242-253.
Cumby et al., On Kernel Methods for Relational Learning, Proceedings of the Twentieth International Conference on Machine Learning, Aug. 2003, pp. 107-114.
Cuzzocrea, Intelligent Knowledge-Based Models and Methodologies for Complex Information Systems, Information Sciences, vol. 194, Jul. 1, 2012, pp. 1-3.
De Salvo Braz et al., An Inference Model for Semantic Entailment in Natural Language, AAAI'05 Proceedings of the 20th National Conference on Artificial Intelligence, vol. 3, Jul. 9-13, 2005, pp. 1043-1049.
Ding et al., Swoogle: A Search and Metadata Engine for the Semantic Web, CIKM '04 Proceedings of the Thirteenth ACM

(56) References Cited

OTHER PUBLICATIONS

International Conference on Information and Knowledge Management, Nov. 8-13, 2004, pp. 652-659.

Erenel et al., Nonlinear Transformation of Term Frequencies for Term Weighting in Text Categorization, Engineering Applications of Artificial Intelligence, vol. 25, No. 7, Oct. 2012, pp. 1505-1514.

Ferretti et al., An Application of Defeasible Logic Programming to Decision Making in a Robotic Environment, International Conference on Logic Programming and Nonmonotonic Reasoning, vol. 4483, May 2007, pp. 297-302.

Folino et al., Proceedings of the 3rd Workshop on Biologically Inspired Algorithms for Distributed Systems, 8th International Conference on Autonomic Computing, Jun. 14-18, 2011.

Galitsky et al., A Novel Approach for Classifying Customer Complaints Through Graphs Similarities in Argumentative Dialogues, Decision Support Systems, vol. 46, No. 3, Feb. 2009, pp. 717-729.

Galitsky, A Tool for Efficient Content Compilation, Proceedings of COLING 2016, the 26th International Conference on Computational Linguistics: System Demonstrations, Dec. 11-17, 2016, pp. 198-202.

Galitsky et al., A Web Mining Tool for Assistance with Creative Writing, European Conference on Information Retrieval, vol. 7814, Mar. 2013, pp. 828-831.

Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.

Galitsky et al., Concept-Based Learning of Human Behavior for Customer Relationship Management, Information Sciences, vol. 181, No. 10, May 15, 2011, pp. 2016-2035.

Galitsky, Finding a Lattice of Needles in a Haystack: Forming a Query from a Set of Items of Interest, FCA4AI'15 Proceedings of the 4th International Conference, vol. 1430, Jan. 2015, 8 pages.

Galitsky et al., Inferring the Semantic Properties of Sentences by Mining Syntactic Parse Trees, Data & Knowledge Engineering, vol. 81-82, Nov.-Dec. 2012, 44 pages.

Galitsky, Learning Parse Structure of Paragraphs and its Applications in Search, Engineering Applications of Artificial Intelligence, vol. 32, Jun. 2014, pp. 160-184.

Galitsky, Machine Learning of Syntactic Parse Trees for Search and Classification of Text, Engineering Applications of Artificial Intelligence, vol. 26, No. 3, Mar. 2013, pp. 1072-1091.

Galitsky, Natural Language Question Answering System: Technique of Semantic Headers, Advanced Knowledge International, vol. 2, Apr. 2003, 333 pages.

Galitsky et al., Parse Thicket Representations for Answering Multi-Sentence Search, International Conference on Conceptual Structures, vol. 7735, Jan. 2013, 13 pages.

Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.

Galitsky et al., Text Classification into Abstract Classes Based on Discourse Structure, Proceedings of Recent Advances in Natural Language Processing, Sep. 7-9, 2015, pp. 200-207.

Galitsky, Transfer Learning of Syntactic Structures for Building Taxonomies for Search Engines, Engineering Applications of Artificial Intelligence, vol. 26, No. 10, Nov. 2013, 32 pages.

Galitsky et al., Using Generalization of Syntactic Parse Trees for Taxonomy Capture on the Web, Proceedings of the 19th International Conference on Conceptual Structures, ICCS, Jul. 25, 2011, pp. 104-117.

Galitsky, Learning Noisy Discourse Trees, Computational Linguistics and Intellectual Technologies, Proceedings of the International Conference "Dialogue 2017". Available online at: http://www.dialog-21.ru/media/3911/galitskyb.pdf, May 31-Jun. 3, 2017, 14 pages.

Garcia et al., Defeasible Logic Programming: An Argumentative Approach, Theory and Practice of Logic Programming, vol. 4, No. 2, Jan. 2004, pp. 95-138.

Gartner, Gartner Says 25 Percent of Customer Service Operations Will Use Virtual Customer Assistants by 2020, Newsroom, Available Online at https://www.gartner.com/newsroom/id/3858564, Feb. 19, 2018, pp. 1-3.

Gildea, Loosely Tree-Based Alignment for Machine Translation, Proceedings of the 41st Annual Meeting of the Association for Computational Linguistics, vol. 1, Jul. 2003, pp. 80-87.

Go et al., Twitter Sentiment Classification Using Distant Supervision, Technical Report, Jan. 2009, 6 pages.

Gomez et al., CICBUAPnlp: Graph-Based Approach for Answer Selection in Community Question Answering Task, Proceedings of the 9th International Workshop on Semantic Evaluation (SemEval 2015), Jun. 4-5, 2015, pp. 18-22.

Gomez et al., Reasoning with Inconsistent Ontologies through Argumentation, Applied Artificial Intelligence, vol. 24, No. 1-2, Feb. 2010, pp. 102-148.

Hendrikx et al., Procedural Content Generation for Games: a Survey, ACM Transactions on Multimedia Computing, Communications and Applications, vol. 9, No. 1, Feb. 2013, pp. 1:1-1:22.

Iosif et al., Unsupervised Semantic Similarity Computation Between Terms Using Web Documents, Institute of Electrical and Electronics Engineers Transactions on Knowledge and Data Engineering, vol. 22, No. 11, Nov. 2010, pp. 1637-1647.

Jaccard, The Distribution of the Flora in the Alpine Zone, New Phytologist, vol. 11, No. 2, Feb. 1912, 15 pages.

Janusz et al., Unsupervised Similarity Learning from Textual Data, Fundamenta Informaticae, vol. 119, Aug. 2012, pp. 319-336.

Johnson et al., Procedural Generation of Linguistics, Dialects, Naming Conventions and Spoken Sentences, Proceedings of 1st International Joint Conference of DiGRA and FDG, 2016, pp. 1-9.

Kapoor et al., Algorithms for Enumerating All Spanning Trees of Undirected and Weighted Graph, SIAM Journal on Computing, vol. 24, No. 2, Society for Industrial and Applied Mathematics, Apr. 1995, pp. 247-265.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Krippendorff, Reliability in Content Analysis: Some Common Misconceptions and Recommendations, Human Communication Research, vol. 30, No. 3, Jul. 2004, 15 pages.

Kuncheva, Classifier Ensembles for Changing Environments, Proccedings 5th Int. Workshop on Multiple Classifier Systems, Springer-Verlag, LNCS, vol. 3077, Jun. 2004, pp. 1-15.

Leouski et al., An Evaluation of Techniques for Clustering Search Results, Available Online at: http://citeseerx.ist.psu.edu/viewdoc/download?doi=10.1.1.34.5627&rep=rep1&type=pdf, 1996, pp. 1-19.

Levenshtein et al., Binary Codes Capable of Correcting Deletions, Insertions, and Reversals, Cybernetics and Control Theory, vol. 10, No. 8, Feb. 1966, pp. 707-710.

Li et al., Adversarial Learning for Neural Dialogue Generation, Empirical Methods in Natural Language Processing, Sep. 7-11, 2017, pp. 2157-2169.

Li et al., DailyDialog: A Manually Labelled Multi-Turn Dialogue Dataset, Proceedings of the Eighth International Joint Conference on Natural Language Processing, Long Papers, vol. 1, Dec. 1, 2017, pp. 986-995.

Li et al., Deep Reinforcement Learning for Dialogue Generation, Empirical Methods in Natural Language Processing, Available Online at: https://www.aclweb.org/anthology/D16-1127, Nov. 2016, pp. 1192-1202.

Liapis et al., Sentient Sketchbook: Computer-Aided Game Level Authoring, In Proceedings of Association for Computing Machinery Conference on Foundations of Digital Games, May 2013, pp. 213-220.

Lin et al., DIRT—Discovery of Inference Rules from Text, Proceedings of the Seventh ACM SIGKDD International Conference on Knowledge Discovery and Data Mining, Aug. 26-29, 2001, pp. 323-328.

Lowe et al., "On the Evaluation of Dialogue Systems with Next Utterance Classification", Proceedings of the 17th Annual Meeting

(56) References Cited

OTHER PUBLICATIONS of the Special Interest Group on Discourse and Dialogue, Available online at: https://arxiv.org/pdf/1605.05414.pdf, Jul. 23, 2016, 6 pages.

Luan et al., LSTM based Conversation Models, arXiv:1603.09457v1, Mar. 31, 2016, 5 pages.

Makhalova et al., News Clustering Approach Based on Discourse Text Structure, Proceedings of the First Workshop on Computing News Storylines, Jul. 2015, pp. 16-20.

Mann et al., Rhetorical Structure Theory: Towards a Functional Theory of Text Organization, Text-Interdisciplinary Journal for the Study of Discourse, vol. 8, No. 3, Jan. 1988, pp. 243-281.

Manning et al., An Introduction to Information Retrieval, Cambridge University Press, vol. 39, 2008, 581 pages.

Mavridis et al., Semantic Analysis of Web Documents for the Generation of Optimal Content, Engineering Applications of Artificial Intelligence, vol. 35, Oct. 2014, pp. 114-130.

Mitkov et al., A Computer-Aided Environment for Generating Multiple-Choice Test Items, Natural Language Engineering, vol. 12, No. 2, Jun. 2006, pp. 177-194.

Moens et al., Argumentation Mining: Where are We Now, Where Do We Want to be and How Do We Get There?, FIRE '12 & '13: Post-Proceedings of the 4th and 5th Workshops of the Forum for Information Retrieval Evaluation, No. 2, Dec. 2013, pp. 1-6.

Moldovan et al., COGEX: A Logic Prover for Question Answering, Proceedings of HLT-NAACL, Main Papers, May-Jun. 2003, pp. 87-93.

Moreda et al., Corpus-Based Semantic Role Approach in Information Retrieval, Data & Knowledge Engineering, vol. 61, No. 3, Jun. 2007, pp. 467-483.

Moschitti, Kernel Methods, Syntax and Semantics for Relational Text Categorization, In proceeding of ACM 17th Conference on Information and Knowledge Management, Oct. 26-30, 2008, pp. 253-262.

Mozina et al., Argument Based Machine Learning from Examples and Text, First Asian Conference on Intelligent Information and Database Systems, Apr. 2009, pp. 18-23.

Nagarajan et al., Pivotal Sentiment Tree Classifier, International Journal of Scientific & Technology Research, vol. 3, No. 11, Nov. 15, 2014, pp. 290-295.

Pak et al., Twitter as a Corpus for Sentiment Analysis and Opinion Mining, Proceedings of the International Conference on Language Resources and Evaluation, May 17-23, 2010, pp. 1320-1326.

Pasternack et al., Extracting Article Text from the Web with Maximum Subsequence Segmentation, Proceedings of the 18th International Conference on World Wide Web, Apr. 20-24, 2009, pp. 971-980.

Perrin et al., An Information-Theoretic Based Model for Large-Scale Contextual Text Processing, Information Sciences, vol. 116, Nos. 2-4, Jan. 1999, pp. 229-252.

Piwek et al., T2D: Generating Dialogues Between Virtual Agents Automatically from Text, Intelligent Virtual Agents, LNAI, vol. 4722, Sep. 2007, pp. 161-174.

Plotkin, A Note on Inductive Generalization, Machine Intelligence 5, Chapter 8, 1970, pp. 153-163.

Poon et al., Unsupervised Semantic Parsing, Proceedings of the 2009 Conference on Empirical Methods in Natural Language Processing, Aug. 2009, pp. 1-10.

Radford et al., Learning to Generate Reviews and Discovering Sentiment, Available Online at: https://arxiv.org/pdf/1704.01444.pdf, Apr. 2017, 9 pages.

Rahwan et al., An Argumentation-Based Approach for Practical Reasoning, Proceedings of the Fifth International Joint Conference on Autonomous Agents and Multiagent Systems, May 8-12, 2006, pp. 347-354.

Redey, Conformal Text Representation, Engineering Applications of Artificial Intelligence, vol. 6, No. 1, Feb. 1993, pp. 65-71.

Robinson, A Machine-Oriented Logic Based on the Resolution Principle, Journal of the Association for Computing Machinery, vol. 12, No. 1, Jan. 1965, pp. 23-41.

Rosenthal et al., SemEval-2014 Task 9: Sentiment Analysis in Twitter, Proceedings of the 8th International Workshop on Semantic Evaluation (SemEval 2014), Aug. 23-24, 2014, pp. 73-80.

Rubiolo et al., Knowledge Discovery Through Ontology Matching: An Approach Based on an Artificial Neural Network Model, Information Sciences, vol. 194, Jul. 2012, pp. 107-119.

Sagui et al., Modeling News Trust: A Defeasible Logic Programming Approach, Inteligencia Artificial, vol. 12, No. 40, Nov. 2008, pp. 63-72.

Sauper et al., Automatically Generating Wikipedia Articles: A Structure-Aware Approach, Proceedings of the 47th Annual Meeting of the Association for Computational Linguistics and the 4th International Joint Conference on Natural Language Processing of the Asian Federation of Natural Language Processing, Aug. 2-7, 2009, pp. 208-216.

Sjoera, The Linguistics Behind Chat Bots, iCapps, Available Online at: http://www.icapps.com/the-linguistics-behind-chatbots/, Feb. 22, 2017, 9 pages.

Socher et al., Recursive Deep Models for Semantic Compositionality Over a Sentiment Treebank, Proceedings of the 2013 Conference on Empirical Methods in Natural Language Processing, Oct. 2013, pp. 1631-1642.

Stevenson et al., A Semantic Approach to IE Pattern Induction, Proceedings of the 43rd Annual Meeting on Association for Computational Linguistics, Jun. 2005, pp. 379-386.

Suykens et al., Advances in Learning Theory: Methods, Models and Applications, IOS Press, NATO Science Series, III: Computer and Systems Sciences, vol. 190, May 2006, 440 pages.

Tang et al., Coooolll: A Deep Learning System for Twitter Sentiment Classification, Proceedings of the 8th International Workshop on Semantic Evaluation (SemEval 2014), Aug. 23-24, 2014, pp. 208-212.

Thompson et al., Learning to Parse NL Database Queries Into Logical Form, Proceedings of the ICML—97 Workshop on Automata Induction, Grammatical Inference, and Language Aquicision, Jul. 1997, 9 pages.

Tneogi, Conversational Interfaces Need a Different Content Management System, Chatbot Magazine, Available Online at https://chatbotsmagazine.com/conversational-interfaces-need-a-different-content-management-system-b105bb6f716, Mar. 26, 2017, pp. 1-3.

Tunkelang, Search Results Clustering, Available Online at: https://queryunderstanding.com/search-results-clustering-b2fa64c6c809, Apr. 16, 2018, pp. 1-3.

Van Durme et al., Towards Light Semantic Processing for Question Answering, Proceedings of the HLT-NAACL 2003 Workshop on Text meaning, vol. 9, May 2003, pp. 54-61.

Wade, 5 Ways Chatbots are Revolutionizing Knowledge Management, Available Online at: https://blog.getbizzy.io/5-ways-chatbots-are-revolutionizing-knowledge-management-bdf925db66e9, Feb. 12, 2018, pp. 1-8.

Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.

Wei et al., Is This Post Persuasive? Ranking Argumentative Comments in Online Forum, Proceedings of the 54th Annual Meeting of the Association for Computational Linguistics, Aug. 7-12, 2016, pp. 195-200.

Wenyin et al., A Short Text Modeling Method Combining Semantic and Statistical Information, Information Sciences, vol. 180, No. 20, Oct. 15, 2010, pp. 4031-4041.

Yang et al., Extract Conceptual Graphs from Plain Texts in Patent Claims, Engineering Applications of Artificial Intelligence, vol. 25, No. 4, Jun. 2012, pp. 874-887.

Zarrella et al., MITRE: Seven Systems for Semantic Similarity in Tweets, Proceedings of the 9th International Workshop on Semantic Evaluation (SemEval 2015), Jun. 4-5, 2015, pp. 12-17.

Zhang et al., Exploring Syntactic Structured Features Over Parse Trees for Relation Extraction Using Kernel Methods, Information Processing & Management, vol. 44, No. 2, Mar. 2008, pp. 687-701.

(56) References Cited

OTHER PUBLICATIONS

Zhang et al., Question Classification Using Support Vector Machines, Proceedings of the 26th Annual International ACM SIGIR Conference on Research and Development in Information Retrieval, Jul. 28-Aug. 1, 2003, pp. 26-32.

U.S. Appl. No. 16/654,258, "Notice of Allowance", dated Sep. 8, 2022, 12 pages.

U.S. Appl. No. 17/974,335, "Notice of Allowance", dated Apr. 27, 2023, 10 pages.

* cited by examiner

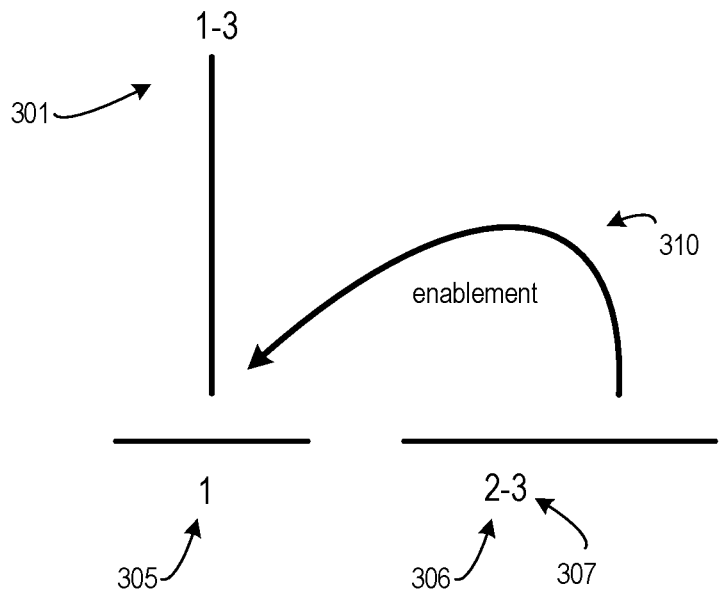
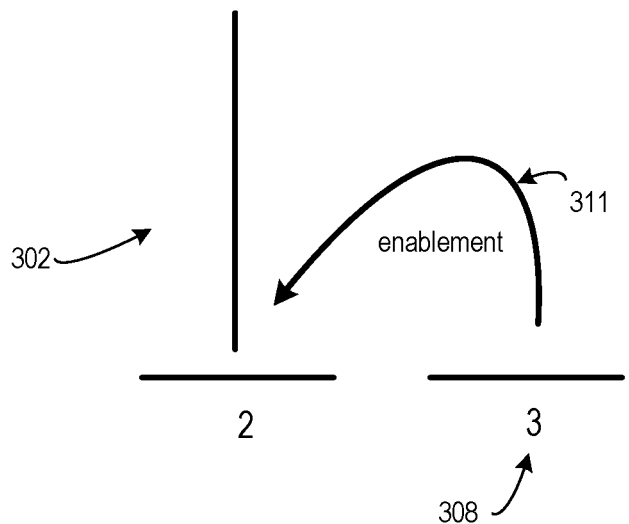
*FIG. 3*

1400

Input: query $q$ in NL, snippet set for the last relevant refinement $A^*_{last}$
Output: ordered set of answers $A^*$ in natural language $A^* = GreedySearch(q, A^*_{last})$ 1401      $A \leftarrow QuerySearchEngine(q)$
1402      $(\delta(q), A_\delta) \leftarrow ComputeFormalRepresentation(q, A)$
1403      $S \leftarrow SimilarityMatrix(A_\delta)$
1404      $C \leftarrow AgglomerativeClustering(\delta(q), A_\delta)$
1405      $found \leftarrow False$
1406      $q_{aug} = \emptyset$
1407      while not $found$ and $(C \neq \{\emptyset\})$ do
1408          $C \leftarrow TakeTheLargestCluster(C)$
1409          $\mathcal{T} \leftarrow \delta^{-1}\left(ComputeDifference(C, \delta(q))\right)$
1410          $r \leftarrow GetUserFeedback(\mathcal{T})$
1411          if $r = showDetails$ then
1412              $q_{aug} \leftarrow \emptyset$
1413              $found \leftarrow True$
1414          end
1415          else if $r = relevant$ then
1416              $q_{aug} \leftarrow q \cup \mathcal{T}$
1417              $found \leftarrow True$
1418          end
1419          else
1420              $C \leftarrow C \setminus \{C\}$
1421          end
1422      end
1423      if *not found* then
1424          $ranking \leftarrow sort(\{w_a \cdot \delta(a) \epsilon C\})$
1425          $A^* \leftarrow selectInGivenOrder(A, ranking)$
1426          if $q_{aug} \neq \emptyset$ then
1427              $A^* \leftarrow GreedySearch(q_{aug}, A^*)$
1428          end
1429      end
1430      else
1431          $A^* \leftarrow A^*_{last}$
1432      end
1433      return $A^*$

> Input: query $\delta(q)$, snippet set $A_\delta$
> Output: set of subsets of snippets $\{A^* | A^* \subseteq A\}$ = *AgglomerativeClustering($\delta(q)$, $A_\delta$)*
>
> 1501     $C \leftarrow A_\delta$
> 1502     $S \leftarrow$ *Syntactic Similarity Matrix* $(C)$
> 1503     $W \leftarrow$ *Relevance Similarity Matrix* $(C)$
> 1504     $S_{ij} = min_{i,j=1,\ldots,|s|}(k_1 S + k_2 W)$
> 1505     $c = merge(c_i, c_j)$
> 1506     $w_c = merge(c_i, c_j)$
> 1507     while *is_included($\delta(q), c$)* do
> 1508        $C \leftarrow (C \setminus \{c_i, c_j\}) \cup \{c\}$
> 1509        $S \leftarrow$ *Syntactic Similarity Matrix* $(C)$
> 1510        $W \leftarrow$ *Relevance Similarity Matrix* $(C)$
> 1511        $S_{ij} = min_{i,j=1,\ldots,|s|}(k_1 S + k_2 W)$
> 1512        $c = merge(c_i, c_j)$
> 1513     end
> 1514     return $\{A * | \ A * \subseteq A, \delta(a) \in C, C \in \mathcal{C}\}$

*FIG. 15*

CHATBOT CONDUCTING A VIRTUAL SOCIAL DIALOGUE

CROSS-REFERENCES TO RELATED APPLICATIONS

The present application is a continuation of U.S. application Ser. No. 16/789,840, filed Feb. 13, 2020, which claims the benefit of U.S. Provisional Application No. 62/804,977, filed Feb. 13, 2019, which is incorporated herein by reference in its entirety. Additional material can be found in co-pending U.S. patent application Ser. No. 16/789,849, filed Feb. 13, 2020, which is incorporated herein by reference in its entirety.

TECHNICAL FIELD

This disclosure is generally concerned with computational linguistics. More specifically, this disclosure relates to creating a virtual social dialogue to facilitate an improved interaction with autonomous agents.

BACKGROUND

Linguistics is the scientific study of language. One aspect of linguistics is the application of computer science to human natural languages such as English. Due to the greatly increased speed of processors and capacity of memory, computer applications of linguistics are on the rise.

For example, the use of autonomous agents to answer questions, facilitate discussion, manage dialogues, and provide social promotion is increasingly popular. To address this need, a broad range of technologies has been developed. But such solutions are limited in the manner in which they can present information to a user. Hence, new solutions are needed.

SUMMARY

Techniques are disclosed for dialogue management. In an example, disclosed techniques facilitate interactions between an autonomous agent and a user device, including providing a virtual social dialogue. A virtual social dialogue is a multi-turn dialogue between imaginary agents that is obtained as a result of content transformation. Content transformation can include translating an existing corpus of text into questions and answers that form the dialogue.

In an aspect, a method of dialogue management for an autonomous agent includes receiving, from a user device, a search query including text fragments. The method further includes obtaining search results by performing a search of electronic documents using the search query. The method further includes generating a syntactic similarity matrix that numerically represents a syntactic similarity between each of the search results. The method further includes generating a relevance similarity matrix that numerically represents a relevancy between each of the search results. The method further includes clustering the search results into clusters by identifying pairs of the search results that are separated in the syntactic similarity matrix by less than a first minimum distance and are separated in the relevance similarity matrix by less than a second minimum distance. The method further includes forming a set of topics by identifying, for each cluster of the clusters, a noun that is common between search results in the cluster. The method further includes outputting the set of topics to the user device. The method further includes receiving, from the user device, a selection of a topic from the set of topics. The method further includes identifying, from the electronic documents, a question and an answer that are relevant to the selected topic. The answer is in rhetorical agreement with the question and the question and the answer form a virtual conversation. The method further includes providing the virtual conversation to the user device.

In an aspect, generating the syntactic similarity matrix includes determining, for each search result of the search results, a distance indicating similarity with each of the other search results. The first minimum distance can be a minimum of the distances.

In a further aspect, generating the relevance similarity matrix includes, for each search result of the search results identifying a set of keywords in the search result and calculating, for each keyword of a set of keywords, a respective frequency of occurrence. The second minimum distance can be derived from the frequencies of occurrence.

In a further aspect, the clustering further includes iteratively, until a threshold number of clusters are obtained: identifying a first search result and a second search result that are separated by a minimum distance and merging, into a cluster, the first search result and the second search result. The method further includes determining, for each cluster, a topic including a noun phrase from a search result associated with the respective cluster.

In an aspect, the identifying includes operations. The operations include constructing, from the electronic documents, a discourse tree. The operations further include identifying, from the discourse tree, satellite elementary discourse units. Each satellite elementary discourse unit represents an answer. The operations further include identifying a sentence corresponding to a satellite elementary discourse unit. The operations further include identifying, within the satellite elementary discourse unit, a word that represents either (i) a noun, (ii) a verb, or (iii) adjective. The operations further include replacing, in the sentence, the word with a question word, thereby creating a question. The identifying includes inserting the question immediately preceding the answer.

In an aspect, the method further includes responsive to receiving a request to interact with the topics, from the user device, searching the topics for a relevant fragment of text. The method further includes responsive to determining that the relevant fragment of text is responsive to the search query, presenting fragment of text to the user device.

In an aspect, the method further includes receiving, from a user device, an additional question including text fragments. The method further includes generating, from the electronic documents, an additional answer. The additional answer is relevant to the topic. The additional answer is in rhetorical agreement with the additional question. The method further includes attributing an additional virtual actor to the additional answer. The method further includes updating the virtual dialogue with the additional answer. The method further includes providing the virtual dialogue to the user device.

In an aspect, the method further includes forming a virtual conversation from the question and the answer by attributing a first virtual actor to the question and a second virtual actor to the answer.

The exemplary methods discussed above can be implemented on systems comprising one or more processors or stored as instructions on a non-transitory computer-readable medium.

BRIEF DESCRIPTION OF THE DRAWINGS

FIG. 3 depicts a further example of a discourse tree in accordance with an aspect of the present disclosure.

FIG. 14 illustrates an example of a greedy search algorithm, in accordance with an aspect of the present disclosure.

FIG. 15 illustrates an approach to Agglomerative Clustering, in accordance with an aspect of the present disclosure.

DETAILED DESCRIPTION

Figure 1:
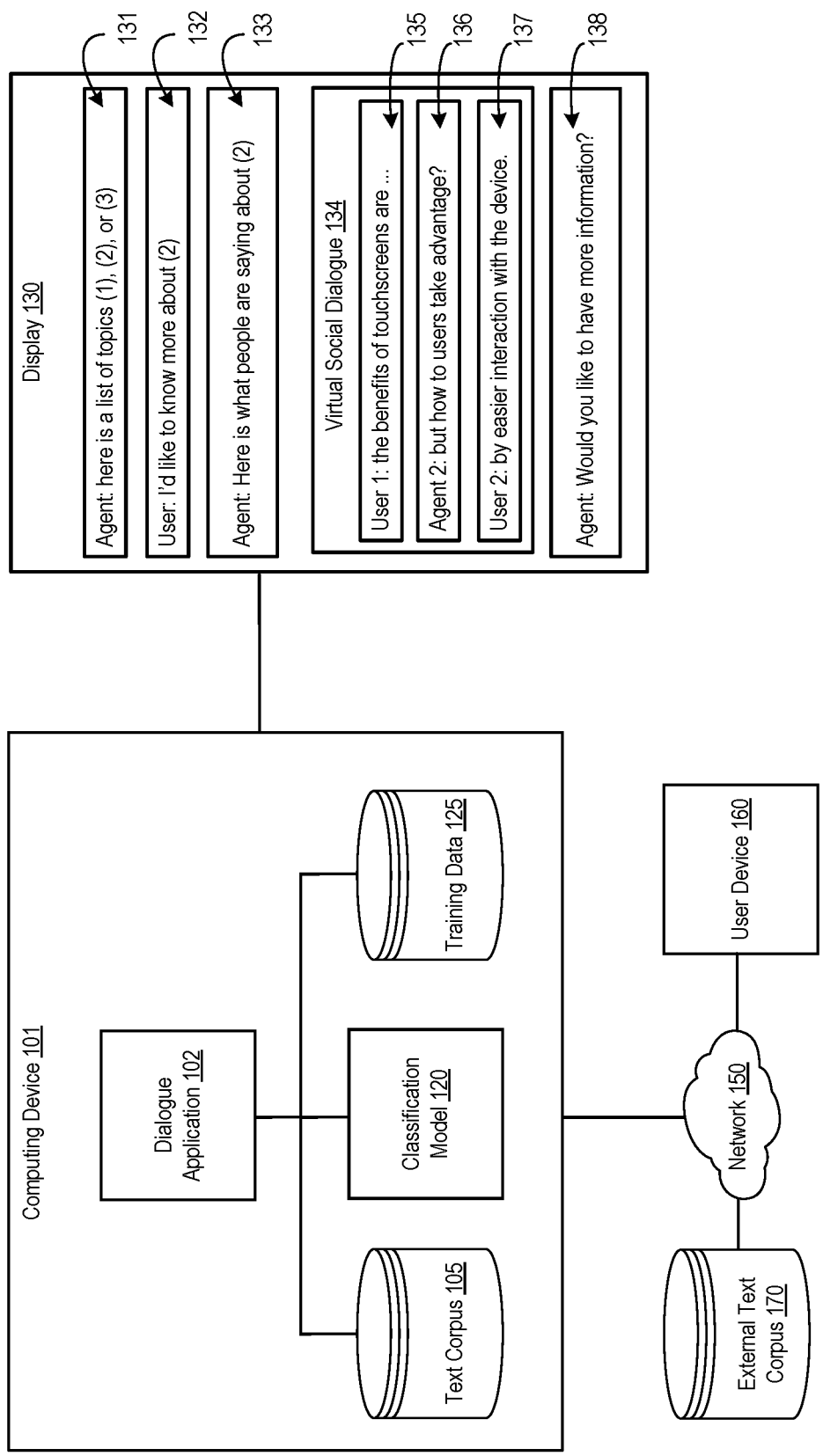
FIG. 1 depicts an example of a computing environment in accordance with an aspect of the present disclosure.

Aspects of the present disclosure relate to autonomous agents ("chatbots") that deliver content in the form of virtual dialogues that are automatically produced from a corpus of text. Example of virtual dialogues are a virtual social dialogue and a virtual persuasive dialogue. A virtual social dialogue is a multi-step dialogue between imaginary agents and/or user devices and can be presented within an interactive session between a user device and an autonomous agent. A virtual persuasive dialogue is a multi-step adversarial argumentation dialogue between imaginary agents obtained as a result of content transformation.

Presentation of knowledge in dialogue format can be more effective than traditional search-based techniques. For example, usability studies have shown that for those acquiring information, dialogues often communicate information more effectively than monologue most of times. Chatbots can provide users with a deep domain knowledge, personalization, interactivity and the level of understanding that can be lacking in modern search engines. Chatbots can also implement social search, providing opinionated data from peers on request, performing personalization, and allow easy navigation through content.

In an example, an autonomous agent executing on a computing device accesses an initial utterance from a user device. The utterance includes a search query, for example "mobile technology." The agent locates multiple documents and determines topics based on the search query from the documents. Clustering can be used to group the determined topics into related clusters. Clustering can include greedy search and/or agglomerative clustering. Determined topics might include "what are the benefits of this technology?" or "when will the technology be ready?"

Continuing the example, the agent presents the determined topics to the user device. The user device can then make a selection of a desired topic, for example, "what are the benefits of this technology?" Upon receiving a selection of a topic, the agent obtains a corpus of texts and creates a virtual social dialogue from the corpus of text. The virtual social dialogue includes questions and answers organized to appear as a dialogue between user devices and autonomous agents. The agent presents the virtual social dialogue to the user device. For example, the dialogue might include "this technology can be leveraged by mobile devices," "how can the technology be leveraged?" and "by providing faster data downloads, thereby enabling new applications." The user can continue to interact with the agent, for example, by requesting additional information, asking the agent questions, or invoking another virtual social dialogue on a different topic.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

Turning now to the Figures, FIG. 1 depicts an example of a computing environment in accordance with an aspect of the present disclosure. FIG. 1 depicts one or more of computing device 101, display 130, network 150, user device 160, and external text corpus 170. In the example depicted in FIG. 1, computing device 101 communicates over network 150 with user device 160. Computing device 101 answers questions transmitted by user device 160 and as appropriate, generates and inserts a virtual social dialogue into interactions between user device 160 and computing device 101. User device 160 can be any mobile device such as a mobile phone, smart phone, tablet, laptop, smart watch, and the like.

Computing device 101 includes one or more of dialogue application 102, text corpus 105, classification model 120, and training data 125. Dialogue application 102 can interact with user device 160 by receiving questions from user device 160 and answering those questions. In some cases, dialogue application 102 can facilitate a virtual social dialogue with user device 160. An example of a process for facilitating virtual social dialogue is discussed further with respect to FIG. 11. Examples of computing device 101 are distributed system 1800 and client computing devices 1802, 1804, 1806, and 1808. Examples of user device 160 include client computing devices 1802, 1804, 1806, and 1808.

Computing device 101 can output interactions, e.g., questions and answers, on display 130. User device 160 can also output interactions on a display. As depicted, display 130 includes various utterances. For example, dialogue application 102 asks a user a question via utterance 131. In turn, the user responds with utterance 132 that he or she would "like to know more." Dialogue application 102 outputs utterance 133, which states "Here is what people are saying about (2)." Dialogue application 102 then generates and outputs virtual social dialogue 134. Virtual social dialogue 134 includes utterances 135-137, which are shown as utterances between virtual users. For example, utterance 135 appears to be from "User 1," utterance 136 from "Agent 2," and utterance 137 from "user 2." Utterances within a virtual social dialogue can appear to be from an autonomous agent or a user.

To generate content for the virtual social dialogue 134, dialogue application 102 generates questions and answers from one or more corpuses of text. For example, dialogue application 102 can use text corpus 105, which can be local to computing device 101, and/or external text corpus 170, which is accessible via network 150. In an aspect, the generation of content can involve creating one or more communicative discourse trees. In an aspect, dialogue application 102 can use classification model 120 to determine rhetorical agreement between sentences (e.g., questions and answers). Classification model 120 can be trained with training data 125. Classification model 120 can be trained to identify rhetorical similarity between text. Classification model 120 can be a predictive model, a classification model, or other model trained to detect a presence of particular features. An example of a model is a support vector machine. For example, classification model 120 can use one or more such models to analyze a communicative discourse tree. Examples of learning approaches include nearest neighbor models and tree kernel models. Examples of features that can be detected include a presence of argumentation, rhetoric agreement, a consecutive answer, or a feature present in text.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

Rhetorical relations can be described in different ways. For example, Mann and Thompson describe twenty-three possible relations. C. Mann, William & Thompson, Sandra.

(1987) ("Mann and Thompson"). Rhetorical Structure Theory: A Theory of Text Organization. Other numbers of relations are possible.

TABLE 1

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation occurrence results from the lack of occurrence of the conditioning situation | whose conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

TABLE 2

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
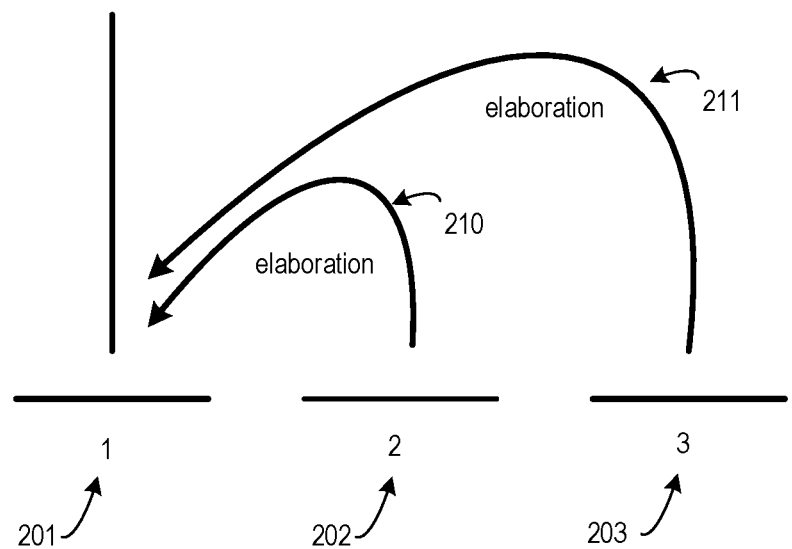
FIG. 2 depicts an example of a discourse tree in accordance with an aspect of the present disclosure.

FIG. 2 depicts an example of a discourse tree in accordance with an aspect of the present disclosure. FIG. 2 includes discourse tree 200. Discourse tree includes text span 201, text span 202, text span 203, relation 210 and relation 238. The numbers in FIG. 2 correspond to the three text spans. FIG. 3 corresponds to the following example text with three text spans numbered 1, 2, 3:

1. Honolulu, Hawaii will be site of the 2017 Conference on Hawaiian History
 2. It is expected that 200 historians from the U.S. and Asia will attend
 3. The conference will be concerned with how the Polynesians sailed to Hawaii For example, relation 210, or elaboration, describes the relationship between text span 201 and text span 202. Relation 238 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect of the present disclosure. FIG. 3 includes components 301 and 302, text spans 305-307, relation 310 and relation 328. Relation 310 depicts the relationship, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:
  (1) Divide the discourse text into units by:
    (a) Unit size may vary, depending on the goals of the analysis
    (b) Typically, units are clauses
  (2) Examine each unit, and its neighbors. Is there a relation holding between them?
  (3) If yes, then mark that relation.
  (4) If not, the unit might be at the boundary of a higher-level relation. Look at relations holding between larger units (spans).
  (5) Continue until all the units in the text are accounted for.

Figure 4:
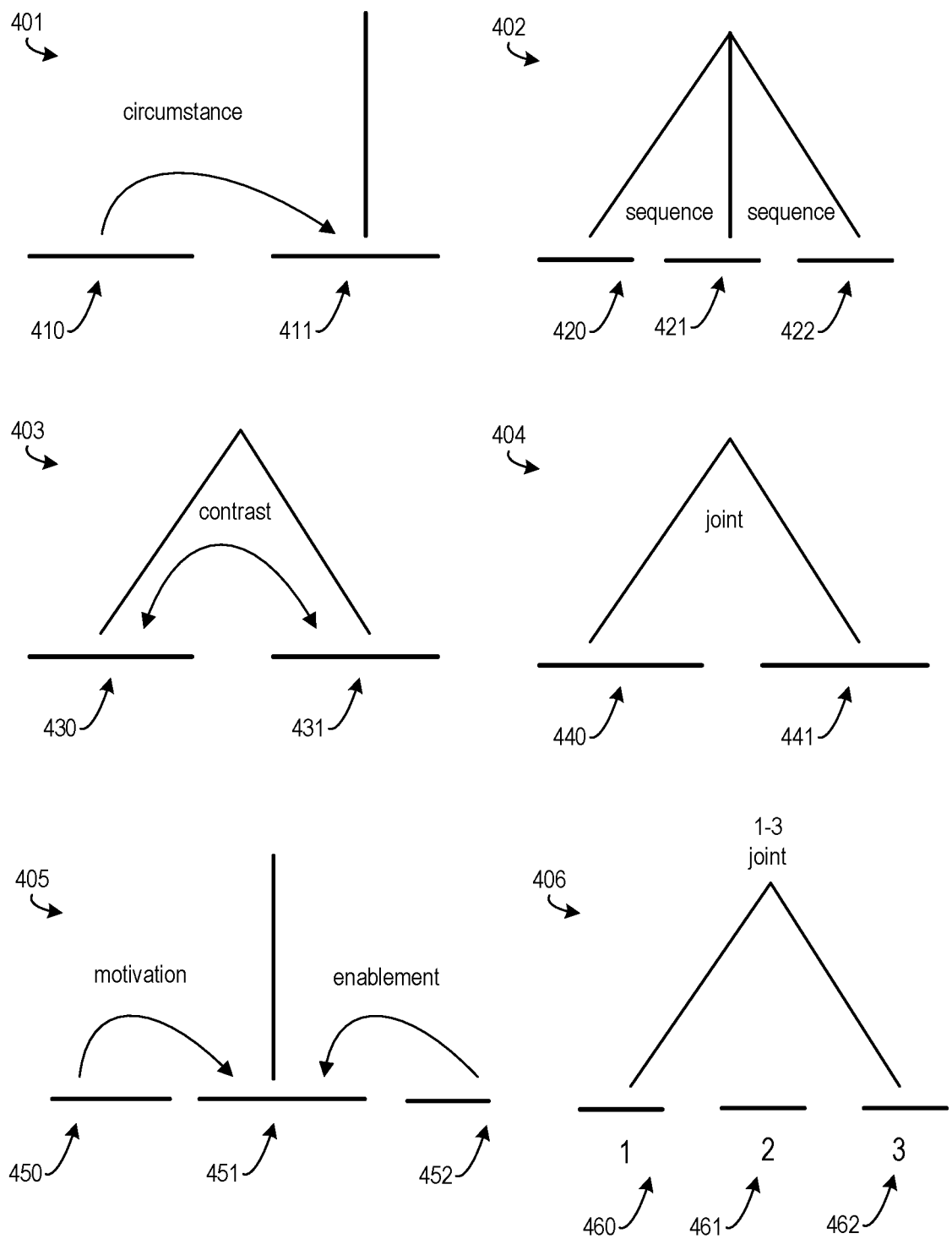
FIG. 4 depicts illustrative schemas in accordance with an aspect of the present disclosure.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect of the present disclosure. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 423. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
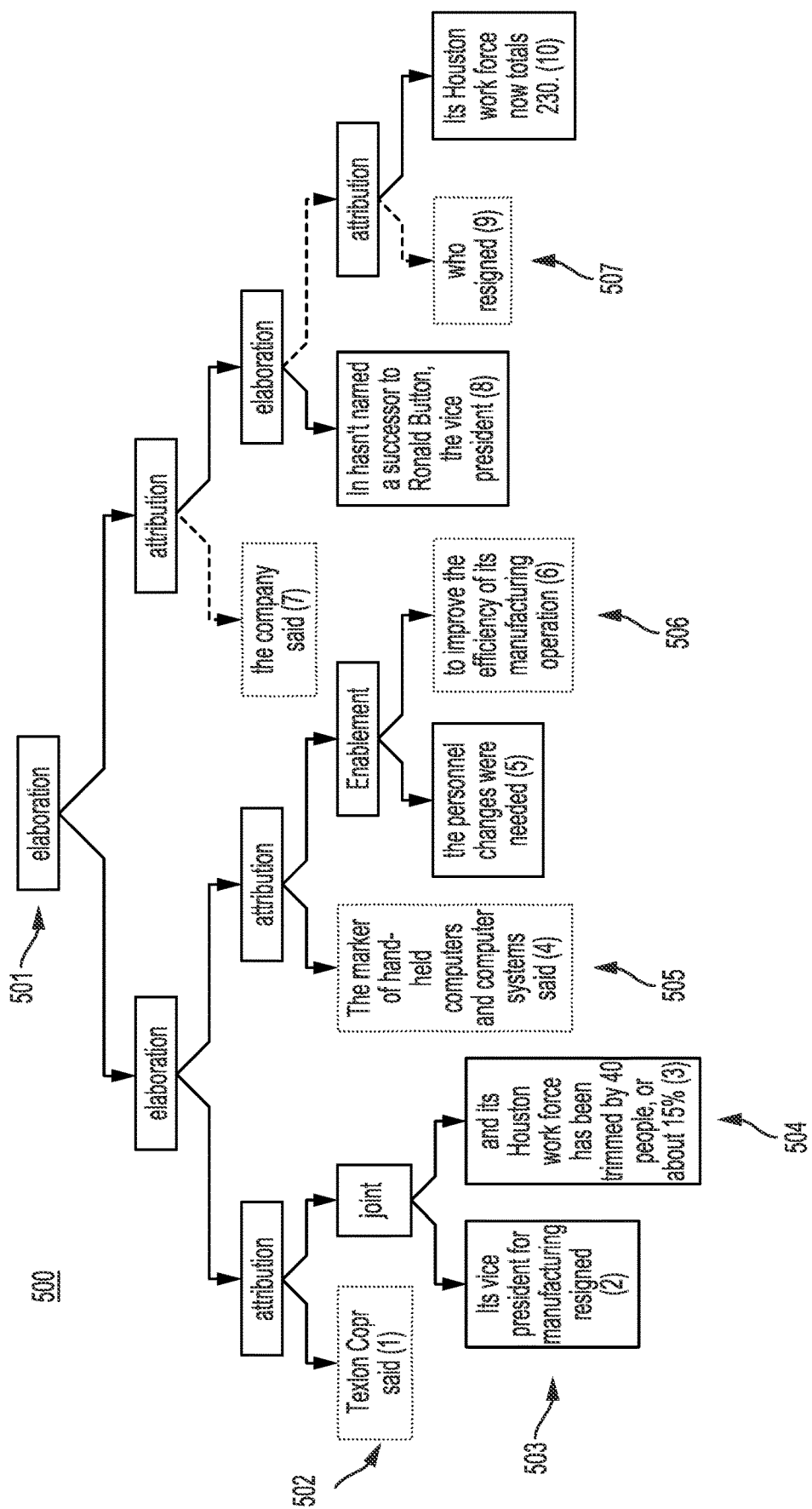
FIG. 5 depicts a node-link representation of the hierarchical binary tree in accordance with an aspect of the present disclosure.

FIG. 5 depicts a node-link representation of the hierarchical binary tree in accordance with an aspect of the present disclosure. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multisentential rhetorical parsing for document-level discourse analysis. In ACL (1), pages 486-496.

Figure 6:
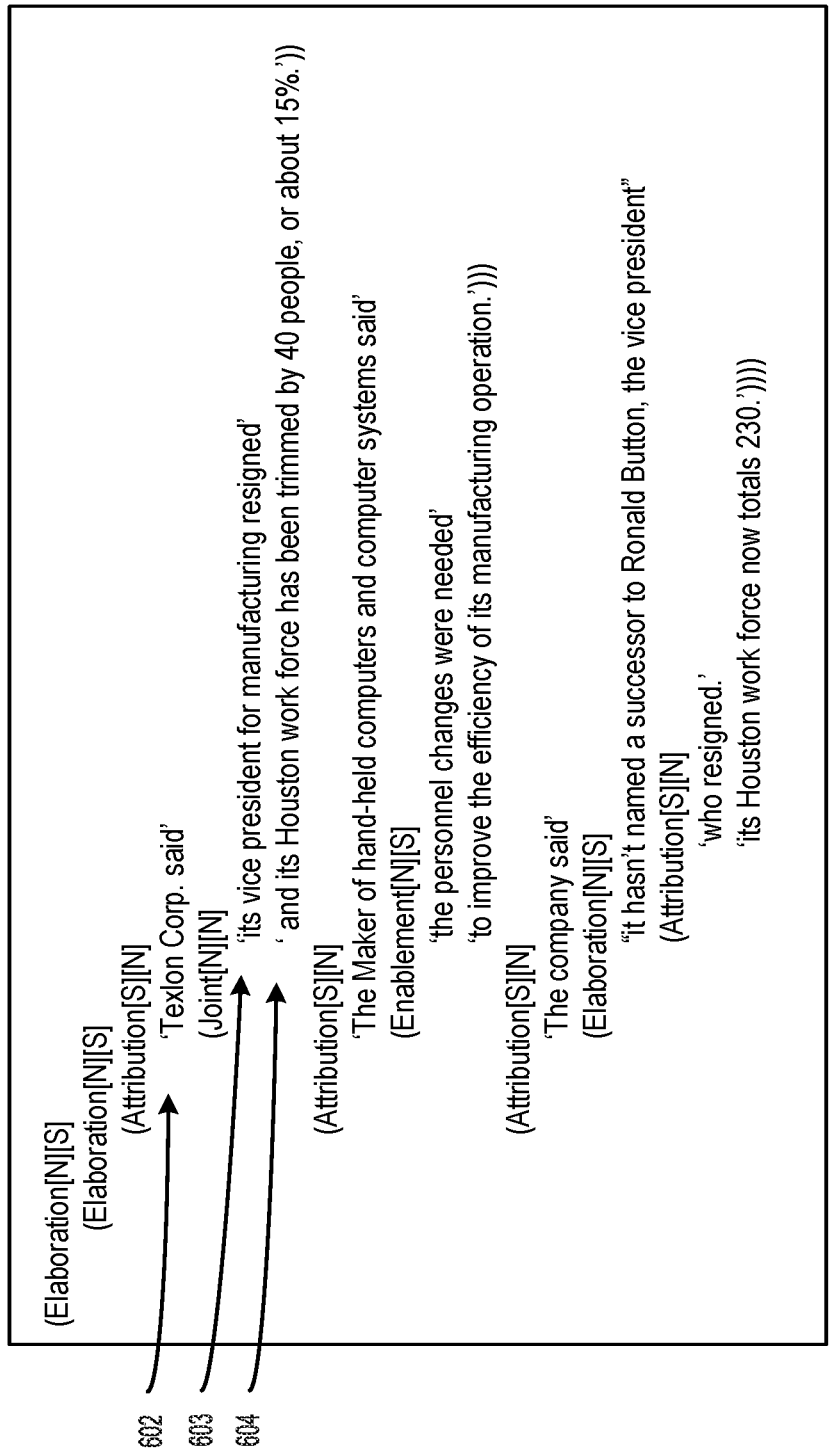
FIG. 6 depicts an exemplary indented text encoding of the representation in FIG. 5 in accordance with an aspect of the present disclosure.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect of the present disclosure. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 30 pages only 20 of which were relevant while failing to return 40 additional relevant pages, its precision is $20/30=2/3$ while its recall is $20/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: $F1=2\times((precision\times recall)/(precision+recall))$ and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as Face-Book® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Discourse Trees

More specifically, to represent linguistic features of text, certain aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
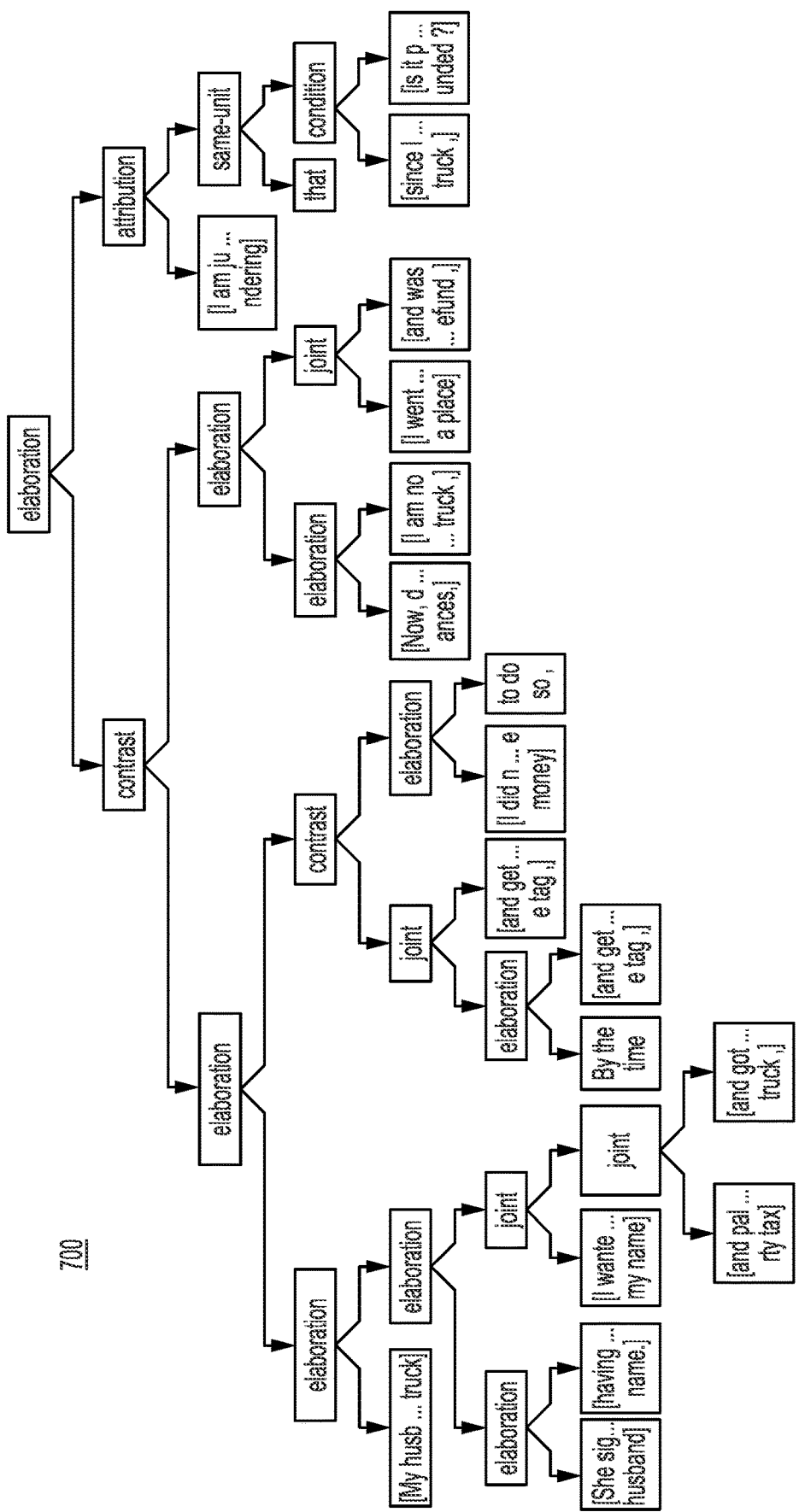
FIG. 7 depicts an exemplary discourse tree for an example request about property tax in accordance with an aspect of the present disclosure.

FIG. 7 depicts an exemplary discourse tree for an example request about property tax in accordance with an aspect of the present disclosure. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
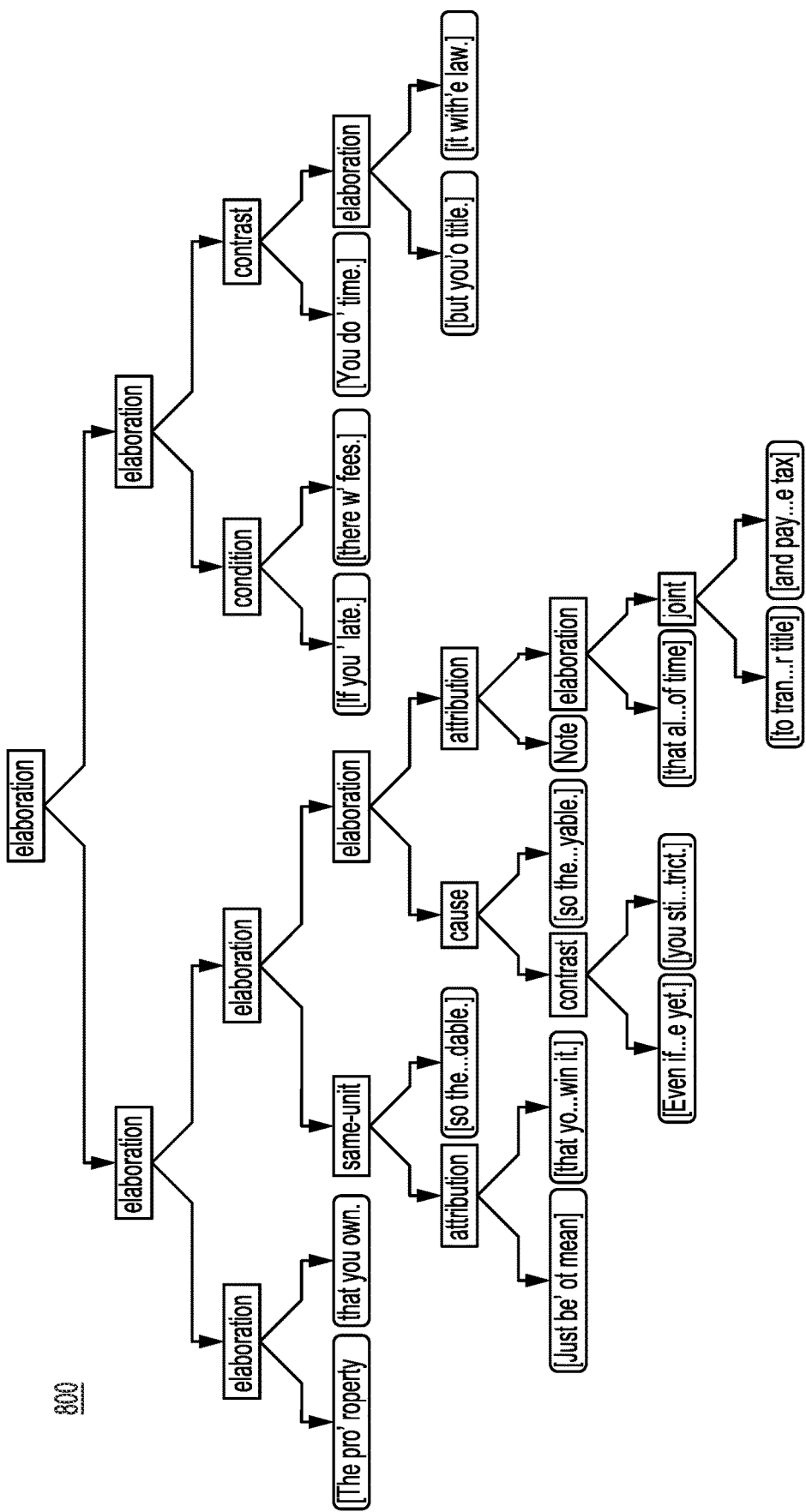
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time."

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
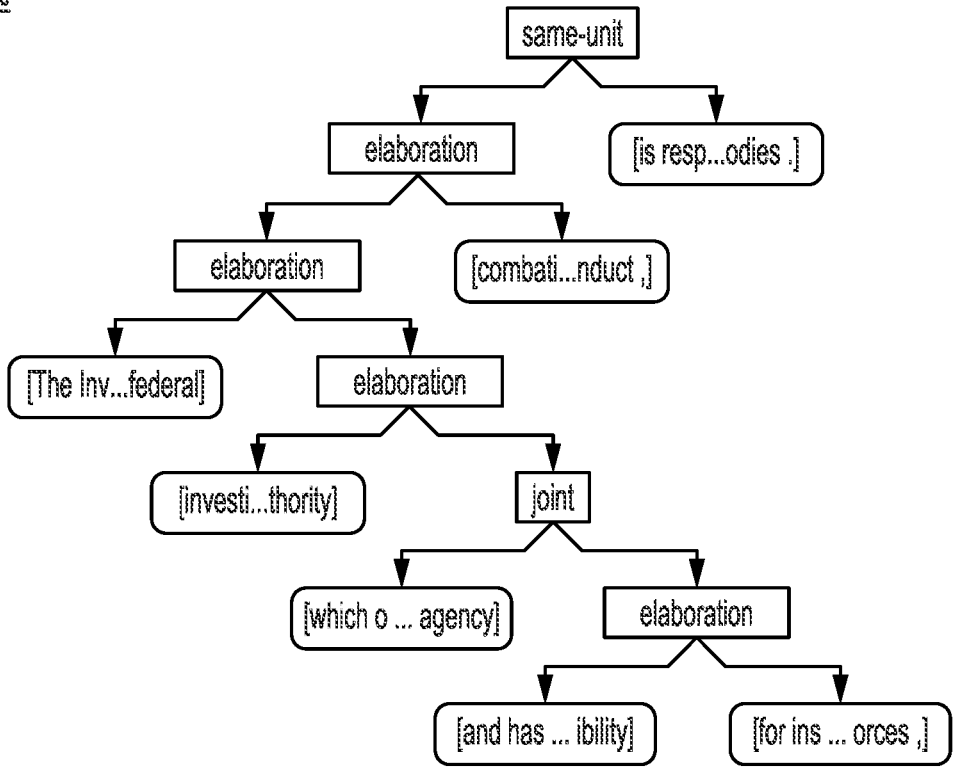
FIG. 9 illustrates a discourse tree for an official answer in accordance with an aspect of the present disclosure.

FIG. 9 illustrates a discourse tree for an official answer in accordance with an aspect of the present disclosure. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
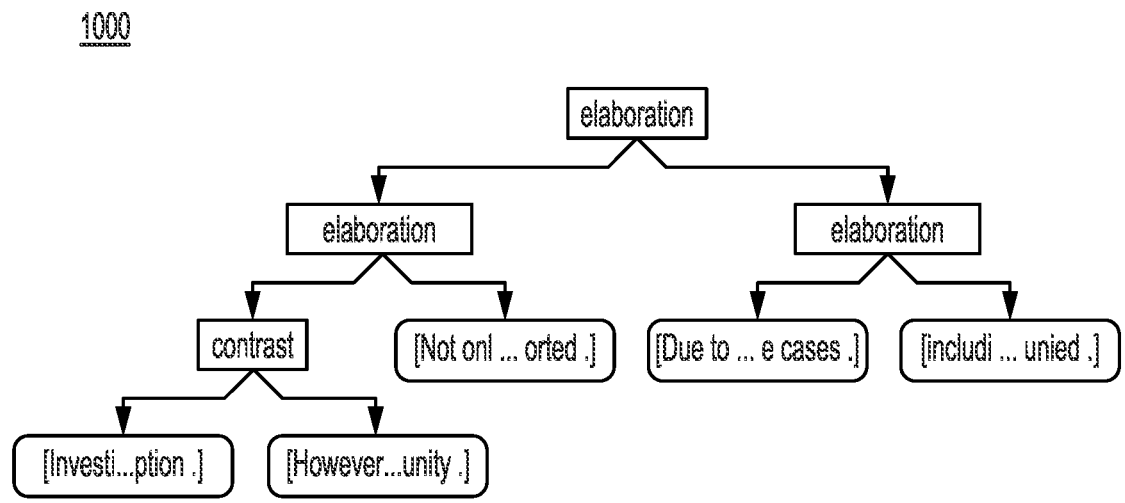
FIG. 10 illustrates a discourse tree for a raw answer in accordance with an aspect of the present disclosure.

FIG. 10 illustrates a discourse tree for a raw answer in accordance with an aspect of the present disclosure. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the raw answer includes the contrast relation. This relation is extracted between the phrase for what an agent is expected to do and what this agent was discovered to have done.

Communicative Discourse Trees (CDTs)

Dialogue application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov SO. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

An exemplary process for building a communicative discourse tree is described below. Dialogue application 102 accesses a sentence comprising fragments. At least one fragment includes a verb and words and each word includes a role of the words within the fragment, and each fragment is an elementary discourse unit. For example, discourse application 102 accesses a sentence such as "Rebels, the self-proclaimed Donetsk People's Republic, deny that they controlled the territory from which the missile was allegedly fired."

Continuing the example, dialogue application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

Dialogue application 102 generates a discourse tree that represents rhetorical relationships between the sentence fragments. The discourse tree includes nodes. Each nonterminal node represents a rhetorical relationship between two of the sentence fragments and each terminal node of the nodes of the discourse tree is associated with one of the sentence fragments.

Continuing the example, dialogue application 102 generates a discourse tree. For example, referring back to the text above, the third fragment, "from which the missile was allegedly fired" elaborates on "that they controlled the territory." The second and third fragments together relate to attribution of what happened, i.e., the attack cannot have been the rebels because they do not control the territory.

Dialogue application 102 accesses multiple verb signatures. Continuing the example, dialogue application 102 accesses a list of verbs, e.g., from VerbNet. Each verb matches or is related to the verb of the fragment. For example, the for the first fragment, the verb is "deny." Accordingly, dialogue application 102 accesses a list of verb signatures that relate to the verb deny.

Each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," discourse application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Dialogue application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

Dialogue application 102 determines, for each verb signature of the verb signatures, a number of thematic roles of the respective signature that match a role of a word in the fragment. For the first fragment, dialogue application 102 determines that the verb "deny" has only three roles, "agent", "verb" and "theme."

Dialogue application selects a particular verb signature from the verb signatures based on the particular verb signature having a highest number of matches. For example, referring again to the text above, deny in the first fragment "the rebels deny . . . that they control the territory" is matched to verb signature deny "NP V NP", and "control" is matched to control (rebel, territory). Verb signatures are nested, resulting in a nested signature of "deny(rebel, control (rebel, territory))."

Dialogue Management Using a Virtual Social Dialogue

Aspects of the present disclosure relate to autonomous agents (chatbots) that deliver content in the form of virtual social dialogues that are automatically produced from textual documents. A virtual social dialogue can be presented as part of an interaction between user and agent.

Dialogue management, which can be performed by dialogue application 102, includes processing clarification requests and hints received from the user device (e.g., an indication that a user is further interested in a specific topic or item of content). Once a current answer is delivered to the user device, the agent can ask whether the user is happy with the answer provided. The agent can suggest options for further interactions, for example, a more traditional question and answer approach or a virtual social dialogue.

Figure 11:
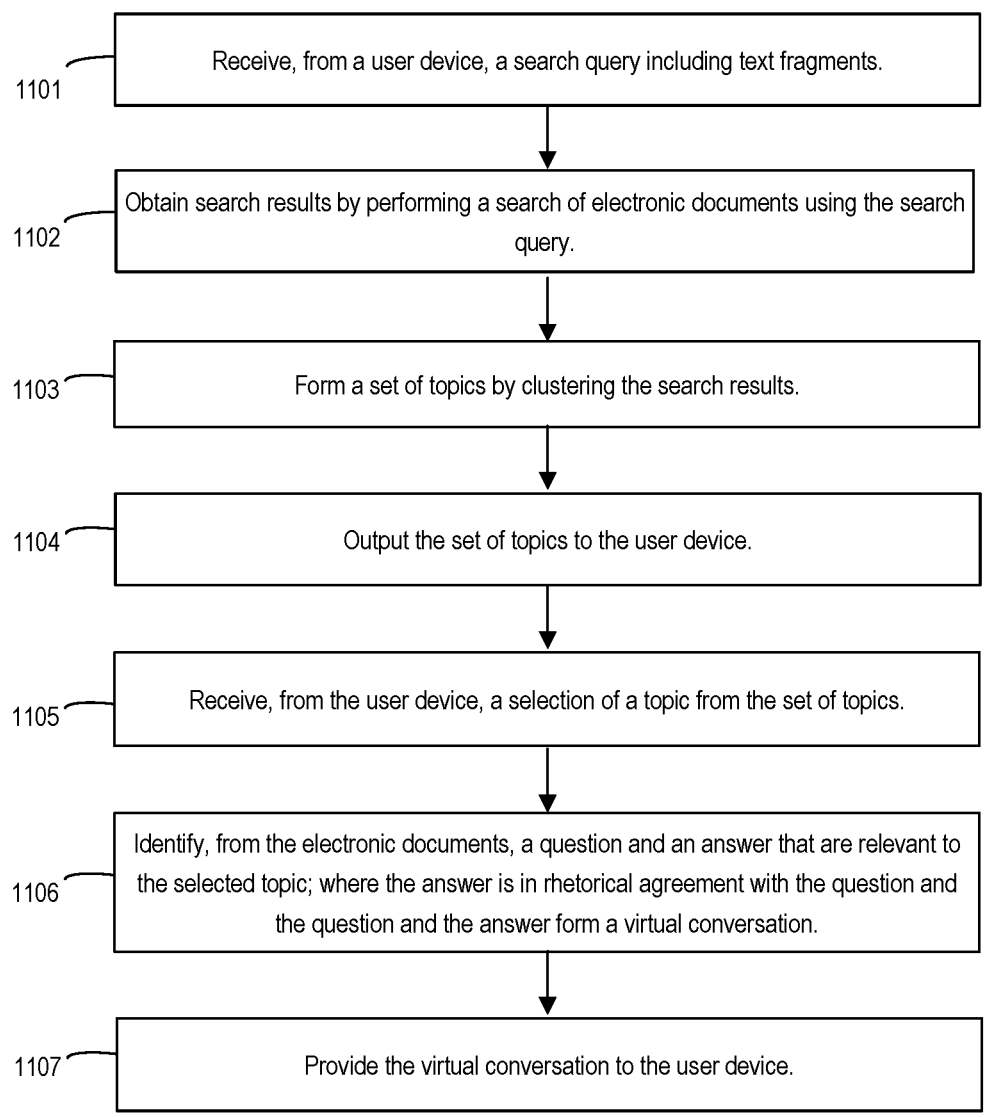
FIG. 11 depicts an exemplary process for dialogue management using a virtual social dialogue, in accordance with an aspect of the present disclosure.

FIG. 11 depicts a process 1100 for dialogue management using a virtual social dialogue, in accordance with an aspect of the present disclosure. FIG. 11 can be implemented by dialogue application 102. For illustrative purposes, FIG. 11 is discussed in conjunction with FIG. 12.

Figure 12:
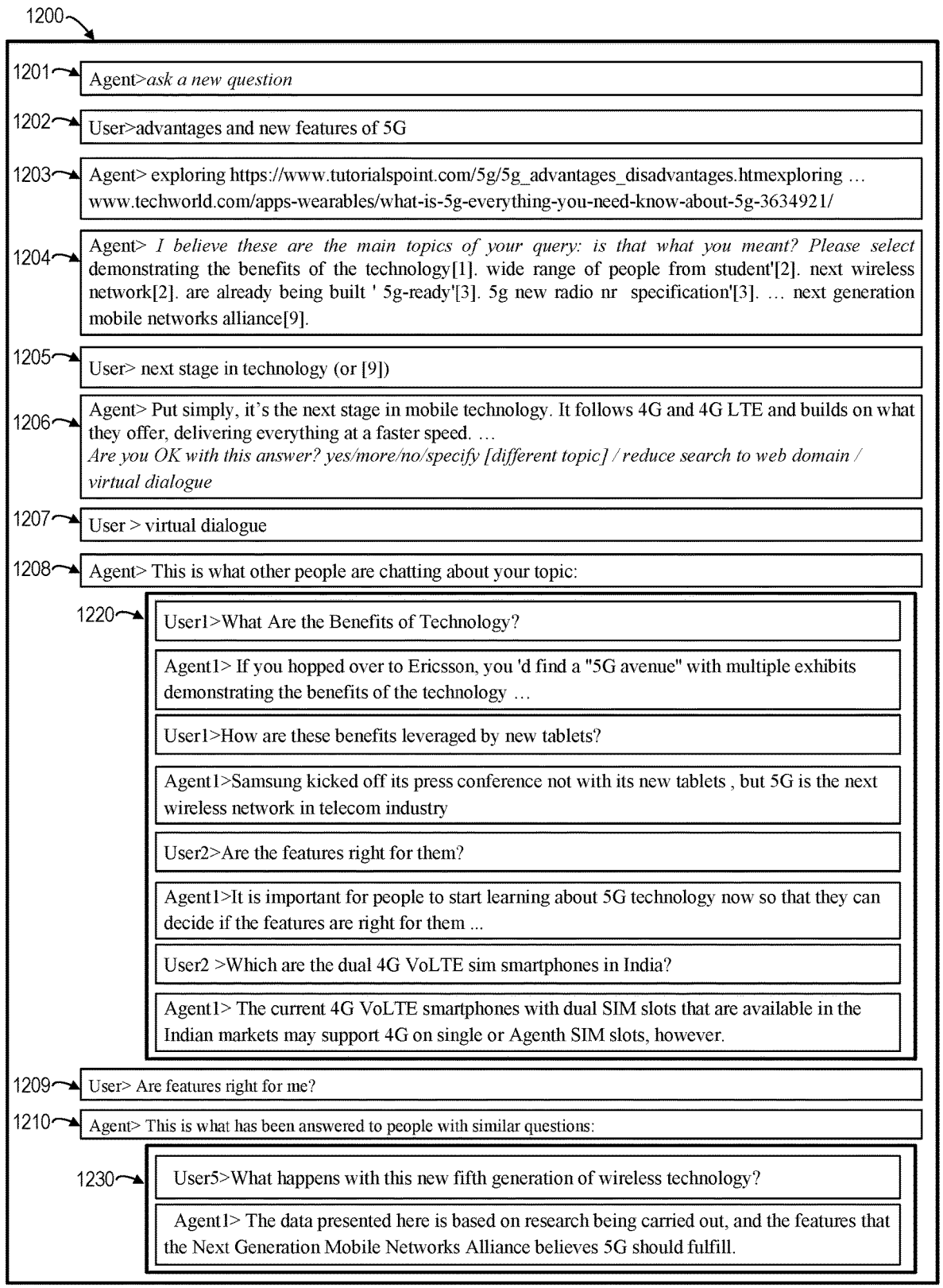
FIG. 12 depicts an exemplary user interface depicting a session using an autonomous agent, depicting conventional and virtual social dialogues, in accordance with an aspect of the present disclosure.

FIG. 12 depicts an exemplary user interface depicting a session using an autonomous agent, depicting conventional and virtual social dialogues, in accordance with an aspect of the present disclosure. FIG. 12 depicts dialogue session 1200. Dialogue session 1200 includes utterances 1201-1210 and virtual social dialogue sessions 1220 and 1230.

In the example depicted in FIG. 12, dialogue application 102, implementing an autonomous agent, interacts with user device 160. Dialogue session 1200 includes two virtual social dialogues 1220 and 1230, but fewer or more virtual social dialogue sessions are possible. Virtual social dialogue 1200 is merely an example; other dialogue sessions can differ. Dialogue application 102 initiates the session by outputting utterance 1201, which states "ask a new question."

At block 1101, process 1100 involves receiving, from a user device, a search query including text fragments. Continuing the example, dialogue application 102 receives the user utterance 1202, which states "advantages and new features of 5G." A user utterance can be in the form of a sentence, question, or simply a few words.

At block 1102, process 1100 involves obtaining search results by performing a search of electronic documents using the search query. Continuing the example, dialogue application 102 searches electronic documents, for example, text corpus 105 or external text corpus 170. Dialogue application 102 can use any standard search techniques to locate relevant electronic documents. For example, keyword-based searching can be employed. In this case, the search results can include results that included a threshold level of keyword matches with the search query.

In some cases, dialogue application 102 outputs a status, such as utterance 1203. As can be seen, utterance 1203 lists some universal resource locators (URLs) which dialogue application 102 analyzes in response to user utterance 1202. Continuing the example, dialogue application 102 retrieves search results based on the search query.

At block 1103, process 1100 involves forming a set of topics by clustering the search results. Clustering involves determining a number of topics from the search results by grouping semantically similar and/or relevant search results together into a topic. Continuing the example, at block 1103, dialogue application 102 forms a set of topics from the search results by using clustering. Clustering is described further with respect to FIG. 13. From the clustering, dialogue application 102 obtains a set of topics.

At block 1104, process 1100 involves outputting, to the user device, the set of topics. Continuing the example, dialogue application 102 outputs utterance 1204, which includes the set of determined topics from block 1103. Utterance 1204 lists options as "demonstrating the benefits of the technology[1]," "wide range of people from student [2]," "next wireless network[2]. are already being built," "5g-ready[3]," "5g new radio nr specification [3]" and "next generation mobile networks alliance[9]." In some cases, as can be seen, dialogue application 102 asks for clarification, for example "I believe these are the main topics of your query: is this what you meant?"

At block 1105, process 1100 involves receiving, from the user device, a selection of a topic from the set of topics. Continuing the example, a user device can transmit a selection to dialogue application 102. The user device selects "next state in technology (or [9])," as depicted in utterance 1205. Continuing the example, dialogue application 102 outputs utterance 1206, which states "Put simply, it's the next stage in mobile technology. It follows 4G and 4G LTE and builds on what they offer, delivering everything at a faster speed . . . ."

In the example shown, dialogue application 102 also asks the user device for further clarification, for example "Are you OK with this answer? yes/more/no/specify [different topic]/reduce search to web domain/virtual social dialogue." Dialogue application 102 can present different options to the user. Examples of options include accepting the answer and concluding the session, navigating to another answer, rejecting the answer, and reformulating the query, narrowing search results to a particular domain, e.g., quota.com, and proceeding to obtain more search results in the form of a virtual social dialogue. As can be seen by utterance 1207, the user device requests a "virtual social dialogue."

At block 1106, process 1100 involves constructing a virtual social dialogue. An example of a process of constructing a virtual social dialogue is discussed further with respect to FIG. 16. For example, dialogue application 102 identifies, from the electronic documents, one or more pairs of questions and answers that are relevant to the selected topic. Each question and the answer form a virtual conversation.

In an aspect, dialogue application 102 can screen questions and answers to ensure that the questions and answers are in rhetorical agreement with each other and/or with the other questions and answers in the virtual social dialogue. Classification model 120 can be trained and used for this purpose.

At block 1107, process 1100 involves providing the virtual conversation to the user device. Continuing the example, dialogue application 102 outputs utterance 1208, which indicates to the user that a virtual social dialogue follows. Dialogue application 102 outputs virtual social dialogue 1220.

As can be seen, the virtual social dialogue 1220 appears as a conversation between imaginary users ("User1" and "User2") and a chatbot ("Agent1"). But any number of users or chatbots can be depicted. The topic of the utterances by the users and chatbots remains consistent with the original query. As long as imaginary chatbot responds to the same person, the dialog is intended to stay cohesive; coreferences in the follow-up questions are maintained.

Further, as depicted, the virtual social dialogue 1220 is shown in frames to draw a visual distinction. The primary dialogue can be viewed as a one in the meta-level, and the object-level dialogue is naturally embedded into the meta-level one.

Continuing the example, a virtual social dialogue can be used one or more times during a dialogue session. For example, as depicted, in response to virtual social dialogue 1220, as indicated by utterance 1209, the user asks "Are these features right for me?" In response, dialogue application 102 outputs utterance 1210, which states "This is what has been answered to people with similar questions." Dialogue application 102 then outputs virtual social dialogue 1230.

Dialogue application 102 can continue to interact with user device 160 as necessary. For example, the user device 160 can navigate through different topics, optionally using virtual social dialogues for the topics.

Clustering

When search queries are formed that express a broad user intent, frequently, fairly large result sets are returned, which can pose a problem for navigation. Clustering can address this problem. Clustering involves grouping search results into semantically similar results (possibly in real-time), and presenting descriptive summaries of these groups to a user. In some cases, clustering allows a user to identify a useful subset of the results, which can be provided as input as a refinement into a clustering algorithm, thereby identifying narrower subsets. Narrower subsets can be easier to navigate. These narrower subsets can be narrowed further.

To be useful, clusters of search results should meet some basic criteria. Firstly, each cluster should be associated with a meaning communicated with the user (by labels, snippets or individual search results indicative of this cluster). Secondly, search results of the same cluster should have a similarity with each other. Each cluster needs to be a coherent subset of possible search intents. Thirdly, search results assigned to different clusters should be substantially different from one another. Each cluster needs to contain a distinct subset of search intents.

For example, a clustering algorithm should implement clustering as a classification of a document into a cluster. Documents can be treated as vectors of weight-term pairs. The system designer needs to decide on which terms to choose and whether to use the whole document or only a part of it as the source of terms. The classification algorithm should be selected. The existing clustering techniques vary in accuracy, robustness, speed and storage requirements. The output of the classifier, or cluster representations, should be determined. The classification process results in a set of clusters, where every cluster contains documents about a unique topic. Clusters can be represented using a selected document or term list, and more creativity with cluster representation is needed. A set of evaluation criteria should be developed. After the classification tool is created, the results need to be analyzed and performance evaluated from the effectiveness and efficiency viewpoint. Evaluation can be difficult in some cases.

Different clustering methods can be used. Primary differences between clustering approaches involve defining the similarity function, adjusting the clustering algorithm, and producing informative snippets for the obtained clusters. Traditional clustering approaches involve embedding documents into vectors and then computing a geometric function on them, such as cosine, to measuring their similarity. While such approaches have a solid theoretical foundation, the results are frequently random and illogical, highly subject to the peculiarities of the documents being clustered.

In an aspect, hierarchical clustering algorithms can also be used. Hierarchical clustering algorithms are either top-down or bottom-up. The former class of algorithms tackles each document as a singleton cluster at the outset and then successively merge (or agglomerate) pairs of clusters until all clusters have been merged into a single cluster that contains all documents. Bottom-up hierarchical clustering is therefore called hierarchical agglomerative clustering. Top-down clustering requires a method for splitting a cluster, doing it recursively until individual documents are reached. An example of clustering approaches are discussed with respect to FIGS. 13-15.

Figure 13:
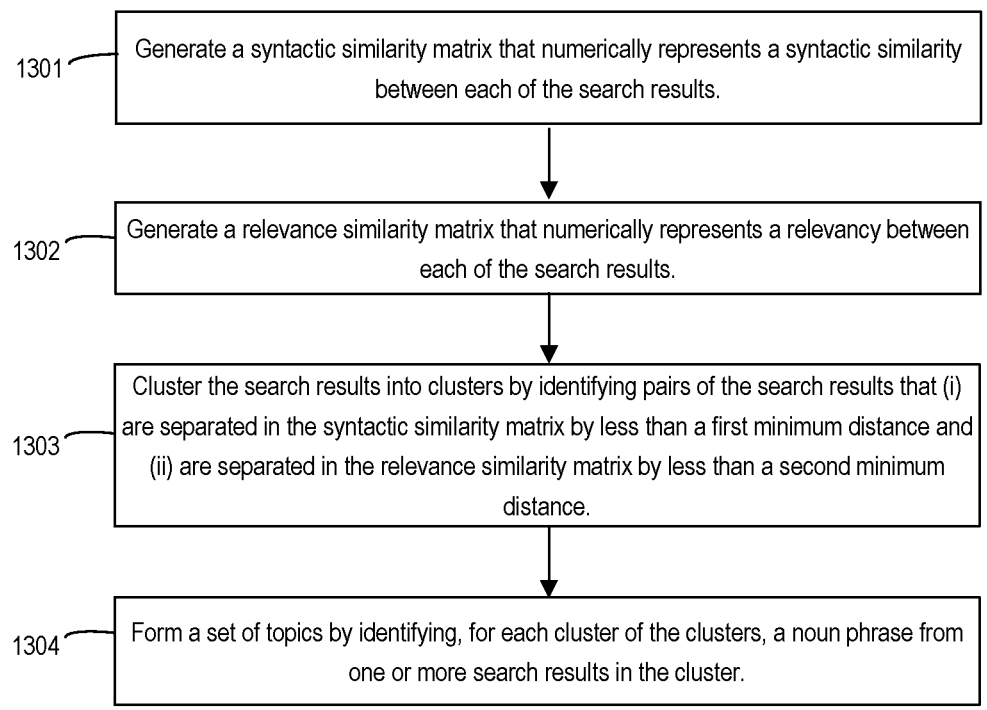
FIG. 13 depicts an exemplary process for clustering, in accordance with an aspect of the present disclosure.

FIG. 13 depicts an exemplary process 1300 for clustering, in accordance with an aspect of the present disclosure. As discussed with respect to FIG. 11, clustering can be used to determine topics from search results obtained from queries of electronic documents. Process 1300 can be implemented by dialogue application 102.

Generally, clustering involves grouping two objects together that have a similarity that is less than a threshold amount, or within a tolerance. For example, each object can be represented by a vector. In the case of objects that are text (e.g., a sentence), the vector can represent a distribution of words (e.g., a histogram). Given a numerical representation, a difference between two fragments of text (e.g., two sentences or utterances) can be quantified.

Dialogue application 102 can cluster text based on syntactic similarity and/or relevance. In some cases, clustering of text can involve comparing both syntactic similarity, e.g., a similarity of the meaning of the objects. For example, consider the example phrases "cellular phone," "mobile phone," "5G [fifth generation cellular] technology," "base station," and "Windows 10."

At block 1301, process 1300 involves generating a syntactic similarity matrix that numerically represents a syntactic similarity between each of the search results. Table 3, below, depicts an example of a syntactic similarity matrix. In table 3, the numbers indicate distance. For example, a "1" indicates high distance (and therefore lower syntactic similarity), whereas a "0" indicates lower distance (and therefore high syntactic similarity). As can be seen, the object "cellular phone" has a high syntactic similarity with "mobile phone" as these objects refer to the same thing.

TABLE 3

|  | Object 1 | Object 2 | Object 3 | Object 4 | Object 5 |
| --- | --- | --- | --- | --- | --- |
| Object 1 "cellular phone" | X | 0 | 1 | 1 | 1 |
| Object 2 "mobile phone" | 0 | X | 1 | 1 | 1 |
| Object 3 "5G technology" | 1 | 1 | X | 1 | 1 |
| Object 4 "base station" | 1 | 1 | 1 | X | 1 |
| Object 5 "Windows 10" | 1 | 1 | 1 | 1 | 1 |

At block 1302, process 1300 involves generating a relevance similarity matrix that numerically represents a relevancy between each of the search results. Clustering can also involve a relevance similarity, e.g., how relevant a first object is to a second object. In the table below, the numbers indicate relevance distance. For example, a "1" indicates high distance (and therefore lower relevancy), whereas a "0" indicates lower distance (and therefore higher relevancy).

Continuing the example, table 4, below depicts an example of a relevance similarity matrix. Table 4 lists objects "cellular phone," "mobile phone," "5G technology," "base station" which are relevant to each other, as reflected in a relevance distance of zero. Table 4 also lists "5G technology," which has a relevance distance of 0.1 from "cellular phone," and "mobile phone." But as can be seen, "Windows 10" is not relevant to any other object, thereby having a relevance distance of 1.

TABLE 4

|  | Object 1 | Object 2 | Object 3 | Object 4 | Object 5 |
|---|---|---|---|---|---|
| Object 1 "cellular phone" | X | 0 | 0 | 0 | 1 |
| Object 2 "mobile phone" | 0 | X | 0 | 0 | 1 |
| Object 3 "5G technology" | 0.1 | 0.1 | X | 0.1 | 1 |
| Object 4 "base station" | 0 | 0 | 0 | X | 1 |
| Object 5 "Windows 10" | 1 | 1 | 1 | 1 | 1 |

At block 1303, process 1300 involves clustering the search results into clusters by identifying pairs of the search results that (i) are separated in the syntactic similarity matrix by less than a first minimum distance and (ii) are separated in the relevance similarity matrix by less than a second minimum distance.

Continuing the example, if a second distance (relevance) is less than 0.2, then the objects "cellular phone," "mobile phone," "5G technology," and "base station" are grouped together but "Windows 10" is not. Therefore, at block 1303, two clusters are formed. The first cluster includes "cellular phone," "mobile phone," "5G technology," and "base station." The second cluster includes "Windows 10."

At block 1304, process 1300 involves forming a set of topics by identifying, for each cluster of the clusters, a noun phrase from one or more search results in the cluster. Continuing the example, the first cluster might be named "cellular," from a word extracted from "cellular phone." The second cluster might be named "Windows." In some cases, the noun phrase occurs in all search results associated with the cluster and/or occupies a position in a title, top-level nucleus (of a discourse tree), abstract, or keyword of the respective search result. In this manner, an importance of the noun to the rest of the text associated with the search result.

A Greedy Search Algorithm

In an example, a greedy search algorithm is used as part of a clustering approach. One example is depicted in FIG. 14.

FIG. 14 illustrates an example of a greedy search algorithm, in accordance with an aspect of the present disclosure. FIG. 14 depicts greedy search algorithm, which includes operations 1401-1433.

The input of the algorithm is a user query q in NL and a subset of snippets $A^*_{last}$ ranked by their relevance for the last successful refined query, each snippet $a \in A^*_{last}$ has a particular real-valued weight $w \in R$. These weights are assigned to snippets by a search engine and reflect not only relevance to the query, but also might take into account the user's profile, item popularity, geo-location, his search history, etc. The input at the initial call is a user query q and the empty set of snippets $A^*_{last}$.

At the first step (line 1) the request is sent to a search engine. Then, a function δ is applied to the set of returned snippets A and the request q in order to obtain their unique formal representations $\delta(q)$ and $A_\delta = \{\delta(a) | a \in A\}$, respectively. This representation makes texts comparable to each other.

To compute clusters (operation 1404) of similar snippets we use two matrices: the matrix of syntactic similarity S and search relevance similarity matrix W with the entries $s_{ij} = sim(\delta(a_i), \delta(a_j))$, $i,j=1, \ldots, |A|$ and $w_{ij} = rel\_sim(w_i, w_j)$, $i,j=1, \ldots, |A|$, respectively.

Values of both similarity matrices can be scaled to [0,1]. Centroids of the computed clusters C are the candidates for a new refined request. Specific information about the clusters is being presented to the user until a cluster with relevant specification is found (operations 1407-1422).

In some cases, a user can further refine the approach. In an example, the interaction with the user is carried out in 4 steps:

1) The biggest clusters C is chosen, i.e., $C = \text{argmax}_{C \in \mathcal{C}} |\{\delta(a) | \delta(a) \in C\}|$ (line 8);
2) The added information in C w.r.t. q is computed. In can be done formally by computing the difference between a centroid of cluster C and $\delta(q)$ (see ComputeDifference function, line 9);
3) The computed difference is translated into a set of phrases $\mathcal{T}$;
4) $\mathcal{T}$ T is shown to the user and feedback r∈{ShowDetails, Relevant, Irrelevant} is received. The feedback defines the further strategy of the chatbot.

ShowDetails means that the user has found the information he or she searched for and all the snippets/documents corresponding to the cluster will be returned to the user ranked by their relevance weights (operation 1425) assigned by the search engine. Relevant answer is the case where the user has found a proposed query specification quite useful, but not enough (i.e., the further query specification is required), in this case a new augmented query $q_{avg}$ is sent to the search engine (operation 1427) via the recursive call of GreedySearch($q_{avg}$, A*), Irrelevant answer describes the case where specifications do not contain relevant information. When all proposed specifications in C are irrelevant, the algorithm returns a subset of snippets from a cluster with the last relevant specification (operation 1431).

Agglomerative Clustering Algorithm

An example of a clustering algorithm is agglomerative clustering. Agglomerative clustering can be applied to the search queries such as those generated at block 1101 of process 1000. Termination criteria ensure that each centroid of clusters (i.e., the shared information of snippets in a cluster) will be the shortest specification of the request.

FIG. 15 illustrates an approach to Agglomerative Clustering, in accordance with an aspect of the present disclosure. FIG. 15 depicts agglomerative clustering algorithm 1500, which includes operations 1501-1514.

In agglomerative clustering algorithm 1500, a cluster is denoted by capital letter C and the corresponding centroid by lower case letter c. For the sake of convenience some functions are defined:

Input: query $\delta(q)$, snippet set $A_\delta$
Output: set of subsets of snippets $\{A^* | A^* \subseteq A\} = \text{AgglomerativeClustering}(\delta(q), A_\delta)$ As mentioned above, requests and snippets are given in NL. We define a mapping δ: L→V that maps a text in natural language to a unique formal representation, L is a space of all possible texts in natural language, V is a space of their formal representations. Further we consider the examples of spaces V and discuss how the functions defined in this section can be rewritten for the considered spaces.

sim: V x V→[0,1]⊂R is a function that evaluates similarity between two objects, the similarity between an object and its copy is equal to 1.

merge: V x V→V is a function that returns a shared description of its two arguments, the shared description is in the same space as the merged arguments. is included:

V×V→{True, False} is a function that returns True if the description of the first argument is included in the description of the second one, False otherwise.

rel_sim: R×R→p [0,1]⊂R is a function that evaluates relevance similarity between two objects by their relevance weights, the similarity between an object and its copy is equal to 1.

Agglomerative clustering receives a query δ(q) and a snippet set $A_δ$ as input, represented in the space where sim, merge and is_included functions are defined. Initially, each snippet a∈$A_δ$ is an individual cluster centroid in $\mathcal{C}$. Pairwise syntactic similarity between cluster centroids is stored in a matrix S of the size |$\mathcal{C}$|×|$\mathcal{C}$|, the relevance similarity is stored in matrix W of the same size |$\mathcal{C}$|×|$\mathcal{C}$|. On each iteration the most similar cluster centroids are chosen (line 1511) to compute a new centroid c, which is their shared description (line 1512). The weight of a new cluster C is the maximal relevance weight of its members, i.e., $w_C$=max{$w_a$|δ(a)∈C}. Here we use capital letters for clusters and lowercase letters for their centroids, i.e. C⊆$A_δ$ for a cluster and c for its centroid.

To compute similarity between centroids, both syntactic and relevant similarities are taken into account. We use a weighted average of the similarities, i.e., similarity between centroids $c_i$ and $c_j$ is defined as $k_1 s_{ij}+k_2 w_{ij}$, where $k_1,k_2$∈R are coefficients of importance of syntactic and relevance similarities, respectively. If a newly created centroid contains the description of the original query (i.e., it retains complete information about the query) the two merged centroids are replaced by their shared description, the weight of the cluster is the maximal weight of the members of the merged clusters, i.e., $w_C$=max{$w_a$|δ(a)∈$C_i$∪$C_j$}. When all the centroids that do not lose the information from the original query are computed (the centroids that include as many snippets as possible and retain information from the query), the subsets of snippets corresponding to the computed centroids are returned.

Computing Similarity

Representing text as a vector. Once the snippets are received, a new set of terms from □∪{q} is computed. The N found terms correspond to the vector entries. Each text is represented by a vector of size N and filled with 0s and 1s. The "1" at i means that the ith term is contained in the text.

1. merge($d_1,d_2$)=$d_1 \cdot d_2$
2. sim($d_1,d_2$):
   (a) sim($d_1,d_2$)=JaccardSimdarity($d_1,d_2$)
   (b) sim($d_1,d_2$)=CosineSimdarity($d_1,d_2$)
   (c) sim($d_1,d_2$)=SimpleMatchingCoefficent($d_1,d_2$)
3. is_included($d_1,d_2$)=$d_1$⊆$d_2$=merge($d_1,d_2$)=$d_1$ The following similarity measure is based on Parse Thickets (Chapter 7)

1. merge($d_1,d_2$)=$d_1 \sqcap d_2$
2. sim($d_1,d_2$):

(a) $sim^{max}(d_1, d_2) := \max_{chunk \in (d_1 \sqcap d_2)}$ Score (chunk)

(b) $sim^{avg}(d_1, d_2) := \frac{1}{|(d_1 \sqcap d_2)|} \sum_{chunk \in (d_1 \sqcap d_2)}$ Score (chunk)

3. is_included($d_1,d_2$)=$d_1 \sqsubseteq d_2$
(c) Relevance Similarity $$rel_{sim(w_i,w_j)} = 1 - \frac{|w_i - w_j|}{\max_{i,j \in 1,\ldots,|A|} w_{ij}}$$

Virtual Social Dialogue Construction

To develop the virtual social dialogue, dialogue application 102 forms questions and answers. Dialogue application 102 identifies, from the electronic documents, a question and an answer that are relevant to the selected topic. The answer is in rhetorical agreement with the question. Together, the question and the answer form a virtual conversation that can be depicted as between one or more agents or users.

For example, to build a question from a paragraph of text, the text is divided into elementary discourse units (EDUs). A discourse tree is formed, in which the EDUs are at the bottom level. From the EDUs, satellite EDUs are then selected as answers to questions, which are derived from these EDUs by means of generalization. The questions are inserted into the corresponding text as if someone is interrupting the speaker in the moments of transition from nucleus to satellite EDUs.

Figure 16:
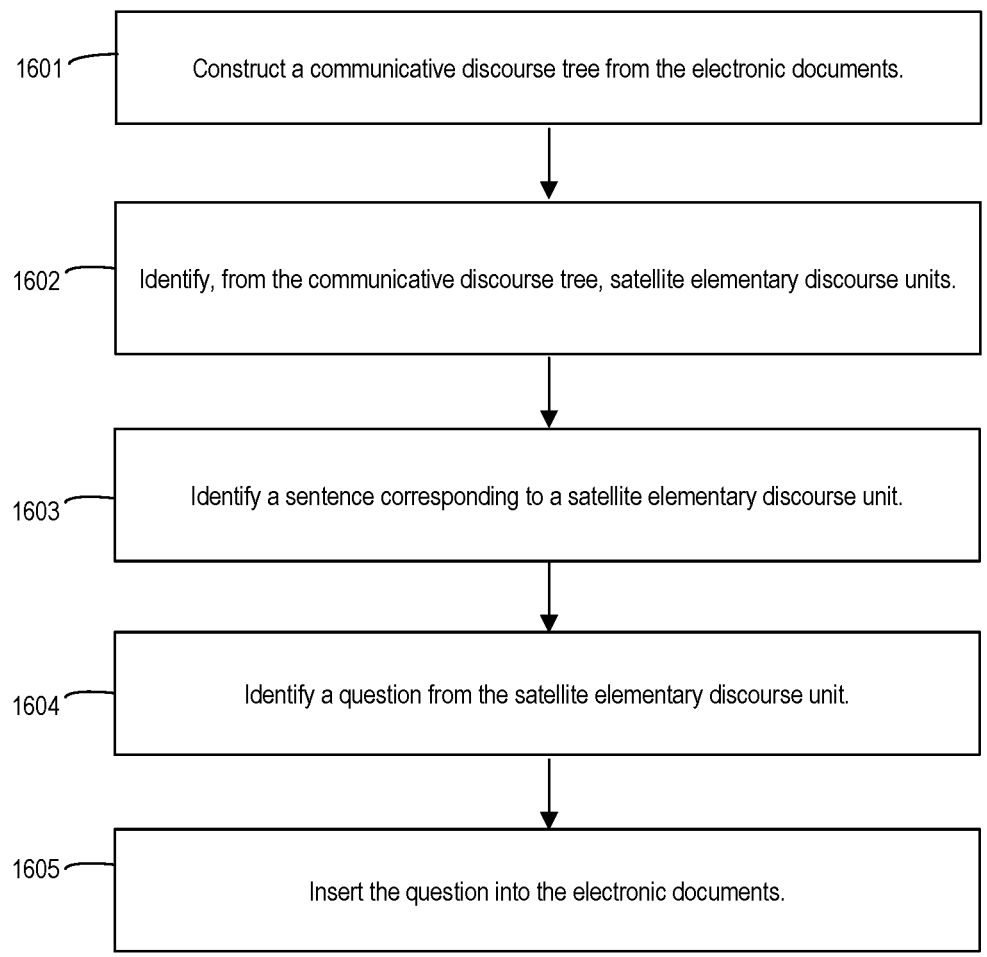
FIG. 16 depicts an exemplary process for a construction of a virtual social dialogue, in accordance with an aspect of the present disclosure.

FIG. 16 depicts an exemplary process 1600 for a construction of a virtual social dialogue, in accordance with an aspect of the present disclosure. Process 1600 can be implemented by dialogue application 102.

Figure 17:
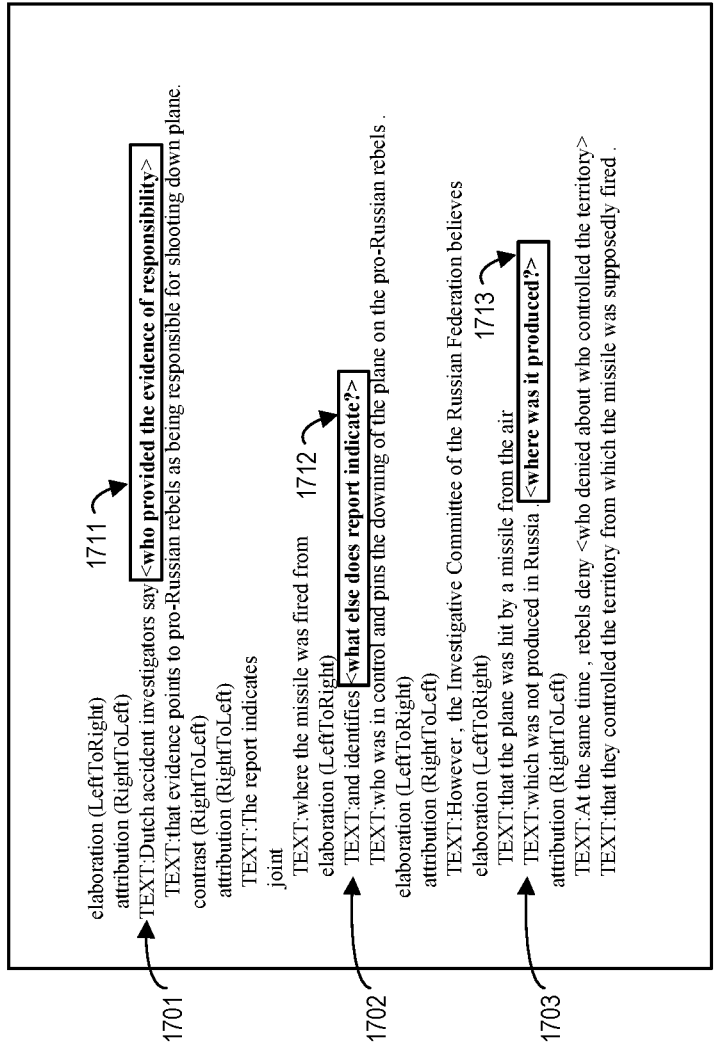
FIG. 17 illustrates an approach to virtual social dialogue construction, in accordance with an aspect.

For illustrative purposes, process 1600 is discussed with respect to FIG. 17.

FIG. 17 illustrates an approach to virtual social dialogue construction, in accordance with an aspect. FIG. 17 depicts part of a discourse tree 1700. Discourse tree includes various rhetorical relations and elementary discourse units. In some cases, discourse tree 1700 can be a communicative discourse tree. Discourse tree 1700 includes satellite EDUs 1701, 1702, and 1703 and corresponding questions 1711, 1712, and 1713.

At block 1601, process 1600 involves constructing a discourse tree from the electronic documents. Dialogue application 102 creates discourse tree 1700. In some cases, dialogue application 102 creates a sequence of discourse trees for the electronic document, a single communicative discourse tree for every a paragraph (e.g., average 3-5 sentences).

At block 1602, process 1600 involves identifying, from the discourse tree, satellite elementary discourse units. Dialogue application 102 identifies satellite EDUs 1701, 1702, and 1703. Each satellite elementary discourse unit can represent an answer.

At block 1603, process 1600 involves identifying a sentence corresponding to a satellite elementary discourse unit. For example, the sentence corresponding to satellite EDU 1703 is "However, the Investigative Committee of the Russian Federation believes that the plane was hit by a missile from the air which was not produced in Russia."

At block 1604, process 1600 involves identifying a question from the satellite elementary discourse unit. Disclosed solutions employ one or more techniques such as rhetorical structure theory, communicative discourse trees, template matching, syntactic generalization, and web-mining. For example, in an aspect, disclosed solutions use rhetorical structure theory to form questions that correspond to the answers. In a further aspect, disclosed solutions use syntactic generalization and other discourse techniques to generate a set of question templates. The question templates can be used to verify that a generated question is of sufficient specificity. For example, a question should not be too specific as to give away the answer (e.g., "What is the name of a rock band from Liverpool, England with four members"). a word that represents either (i) a noun, (ii) a verb, or (iii) adjective. Continuing the example, the satellite elementary discourse unit (EDU) 1703 is "which was not produced in Russia."

At block 1605, process 1600 involves inserting the question into the electronic document. Discourse approaches can be used to guide placement of the questions in the electronic documents.

Evaluation of Dialogue Effectiveness and Coverage

Evaluating the effectiveness of information delivery via virtual social dialogues, we compare the traditional chatbot sessions where users were given plain-text answers, and the ones where users were given virtual social dialogues.

Results on comparative usability of conventional dialogue and virtual social dialogue are presented. Dialogues are assessed with respect to following usability properties:

1) The speed of arriving to the sought piece of information. It is measured as a number of iteration (a number of user utterances) preceding the final reply of the chatbot which gave an answer wanted by the user. We measure the number of steps only if the user confirms that she accepts the answer.
2) The speed of arriving to a decision to commit a transaction such as purchase or reservation or selection. A user is expected to accumulate sufficient information, and this information such as reviews should be convincing enough for making such decision.
3) A number of entities that were explored during a session with the chatbot is also measured. How thorough and comprehensive the chatbot session is of particular interest, in particular, how much the user actually learns from it. This assessment is sometimes opposite to the above two measures but is nevertheless important for understanding the overall usability of various conversational modes.

Precision and recall of search sessions with either dialogue mode are not compared, because the same information is delivered, but in distinct modes.

The evaluation of usability is presented in Table 1.

TABLE 1

Evaluation of comparative effectiveness of conventional and virtual social dialogues

| | Conventional dialogues | | | Virtual social dialogues | | |
|---|---|---|---|---|---|---|
| | # of iterations till found | # iterations till decision | Coverage of exploration # of entities | # of iterations till found | # iterations till decision | Coverage of exploration # of entities |
| Conventional only | 4.6 | 6.3 | 10.8 | — | — | — |
| Virtual only | — | — | — | 4.1 | 6.0 | 13.7 |
| Conventional followed by virtual | 4.0 | 5.7 | 7.6 | 6.1 | 11.3 | 15.1 |
| Virtual followed by conventional | 5.6 | 7.1 | 12.3 | 3.7 | 7.0 | 11.5 |

In the second and third rows, we assess the stand-alone systems. One can observe that virtual social dialogues take less iteration on average for information access and about the same number of iterations for decisions as conventional dialogues do. Virtual social dialogues stimulate the user to explore a higher number of entities though.

Notice that the bottom row, the chat scenario proceeds from right to left. In the bottom two rows, we observe the usability of the hybrid system. When a conventional dialogue is followed by a virtual one, a lower portion of users is satisfied by the first step in comparison to the inverse architecture, where virtual is followed by conventional.

Related Work and Conclusions (Piwek et al 2007) were pioneers of automated construction of dialogues, proposing Text2Dialogue system. The authors provided a theoretical foundation of the mapping that the system performs from RST structures to Dialogue representation structures. The authors introduced a number of requirements for a dialogue generation system (robustness, extensibility, and variation and control) and reported on the evaluation of the mapping rules.

An important body of work concerns tutorial dialogue systems. Some of the work in that area focuses on authoring tools for generating questions, hints, and prompts. Typically, these are, however, single utterances by a single interlocutor, rather than an entire conversation between two agents. Some researchers have concentrated on generating questions together with possible answers such as multiple choice test items, but this work is restricted to a very specific type of question-answer pairs (Mitkov et al 2006).

Conversion of a text into a dialogue is different from the dialogue generation problem; the former is a training set—based foundation for the latter.

Response generation for dialogue can be viewed as a source-to-target transduction problem. (Sordoni et al. 2015) rescores the outputs of a phrasal machine translation-based conversation system with a neural model incorporating prior context. Recent progress in sequence-to-sequence models has been leveraged (Luan et al., 2016) to build an end-to-end dialogue systems that firstly applies an utterance message to a distributed vector representation using an encoder, then secondly generates a response from this representation. (Li et al. 2016) simulate dialogues between two virtual agents, using policy gradient methods to reward sequences that display three useful conversational properties: informativity, coherence, and ease of answering. We measured comparable dialogue effectiveness properties such as the speed of arrival to a search result, a decision and domain coverage, in the current study.

Dialogue acts is an important source which differentiates between a plain text and a dialogue. Proposed algorithm of virtual social dialogues can assist with building domain-specific chatbot training datasets. Recently released dataset, DailyDialog (Li et al., 2017b), is the only dataset that has utterances annotated with dialogue acts and is large enough for learning conversation models. Unlike the virtual social dialogues produced in this study, in DailyDialog conversations are not task oriented, and each conversation focuses on one topic. Each utterance is annotated with four dialogue acts.

We proposed a novel mode of chatbot interaction via virtual social dialogue. It addresses sparseness of dialogue data on one hand and convincingness, perceived authenticity of information presented via dialogues on the other hand. We quantitatively evaluated improvement of user satisfaction with virtual social dialogue in comparison to regular chatbot replies and confirmed the strong points of the former. We conclude that virtual social dialogue is an important feature related to social search to be leveraged by a chatbot.

Example Computing Systems

Figure 18:
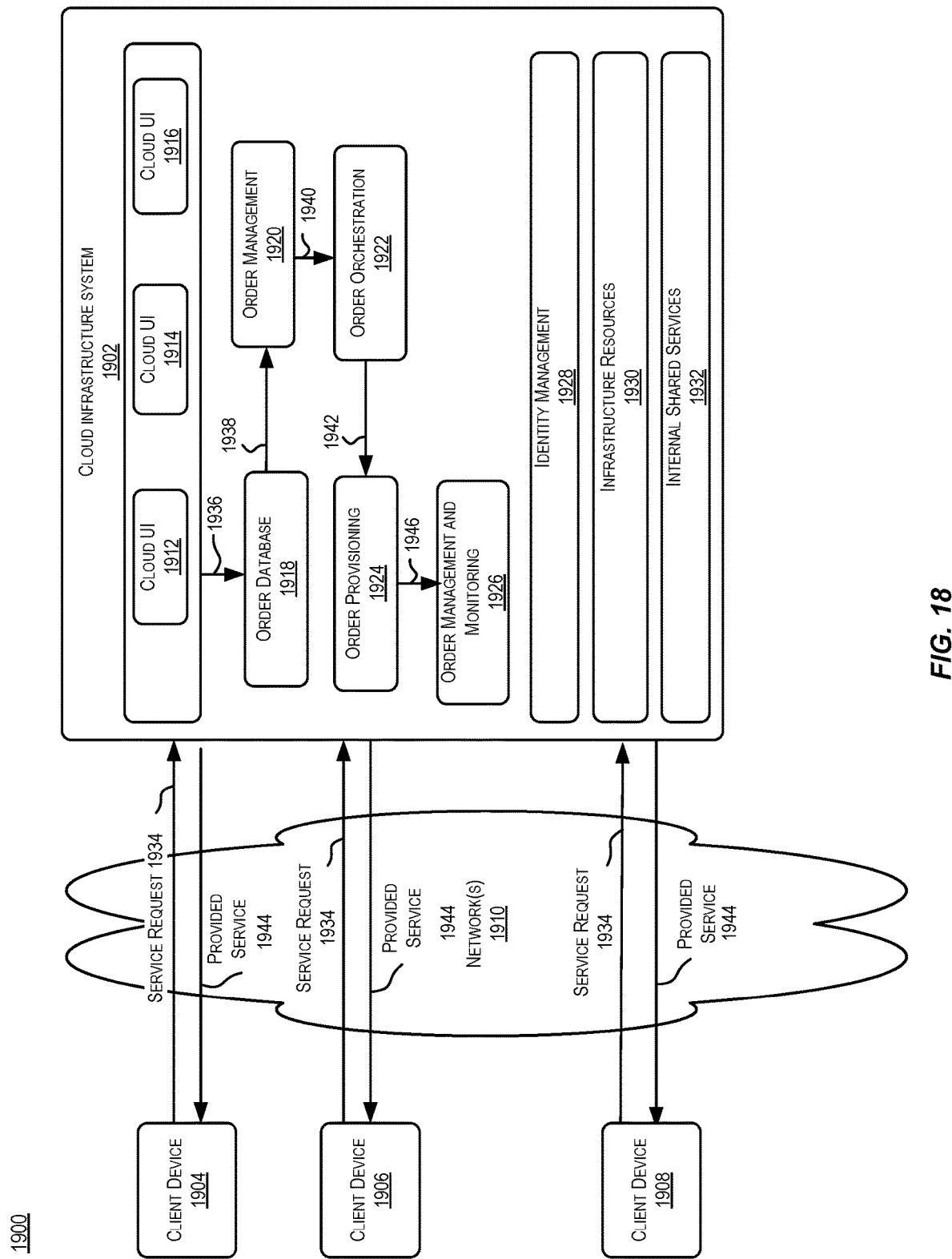
FIG. 18 depicts a simplified diagram of a distributed system for implementing one of the aspects.

FIG. 18 depicts a simplified diagram of a distributed system 1800 for implementing one of the aspects. In the illustrated aspect, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 1812 may be communicatively coupled with remote client computing devices 1802, 1804, 1806, and 1808 via network 1810.

In various aspects, server 1812 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other aspects, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The aspect shown in the figure is thus one example of a distributed system for implementing an aspect system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.18 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1812 can include one or more virtual machines running virtual operating systems, or other computing architectures involving virtualization. One or more flexible pools of logical storage devices can be virtualized to maintain virtual storage devices for the server. Virtual networks can be controlled by server 1812 using software defined networking. In various aspects, server 1812 may be adapted to run one or more services or software applications described in the foregoing disclosure. For example, server 1812 may correspond to a server for performing processing described above according to an aspect of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of aspects, databases 1814 and 1816 may reside in a storage-area network (SAN). Similarly, any necessary files for performing the functions attributed to server 1812 may be stored locally on server 1812 and/or remotely, as appropriate. In one set of aspects, databases 1814 and 1816 may include relational databases, such as databases provided by Oracle, that are adapted to store, update, and retrieve data in response to SQL-formatted commands.

Figure 19:
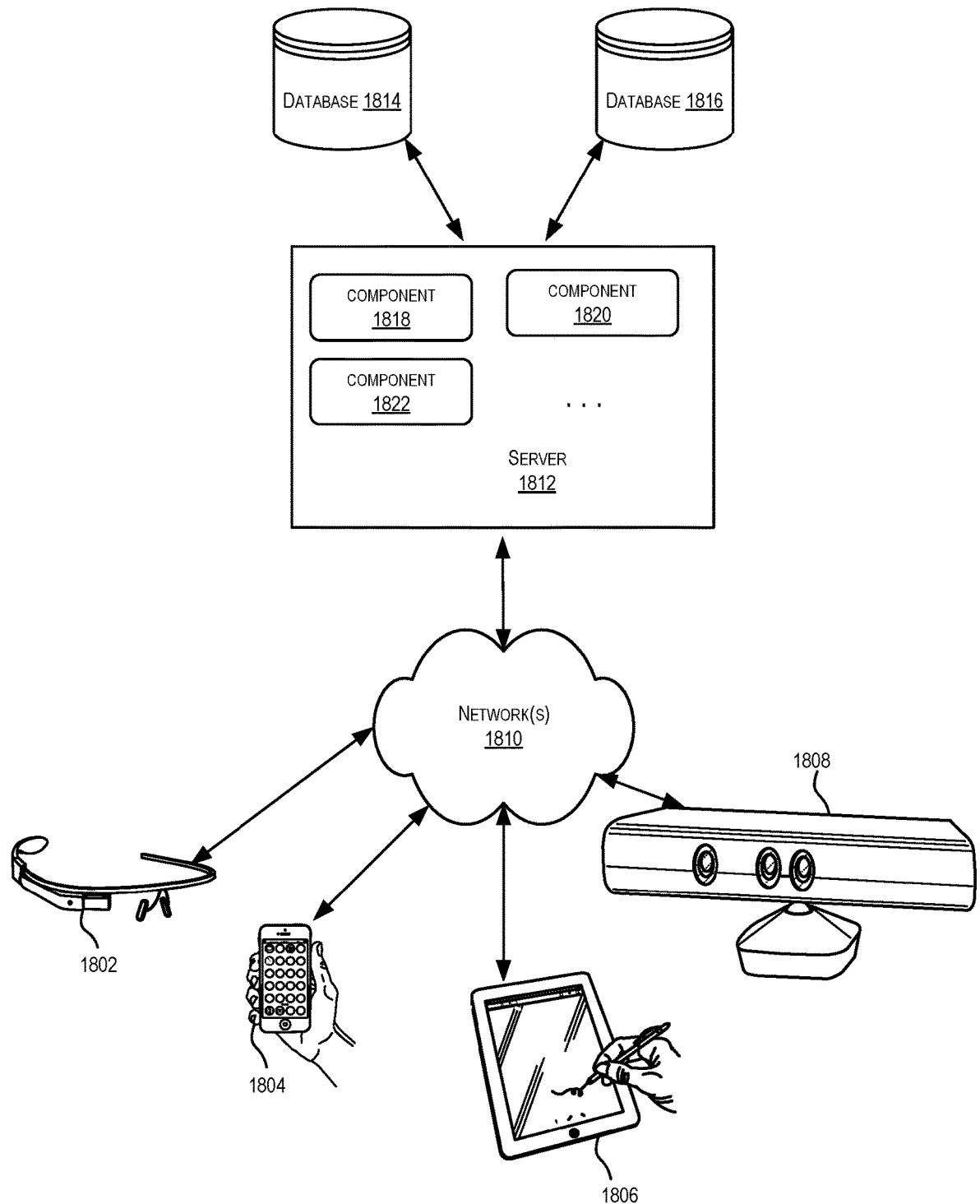
FIG. 19 is a simplified block diagram of components of a system environment by which services provided by the components of an aspect system may be offered as cloud services in accordance with an aspect.

FIG. 19 is a simplified block diagram of one or more components of a system environment 1900 by which services provided by one or more components of an aspect system may be offered as cloud services, in accordance with an aspect of the present disclosure. In the illustrated aspect, system environment 1900 includes one or more client computing devices 1904, 1906, and 1908 that may be used by users to interact with a cloud infrastructure system 1902 that provides cloud services. The client computing devices may be configured to operate a client application such as a web browser, a proprietary client application (e.g., Oracle Forms), or some other application, which may be used by a user of the client computing device to interact with cloud infrastructure system 1902 to use services provided by cloud infrastructure system 1902.

It should be appreciated that cloud infrastructure system 1902 depicted in the figure may have other components than those depicted. Further, the aspect shown in the figure is only one example of a cloud infrastructure system that may incorporate an aspect of the invention. In some other aspects, cloud infrastructure system 1902 may have more or fewer components than shown in the figure, may combine two or more components, or may have a different configuration or arrangement of components.

Client computing devices 1904, 1906, and 1908 may be devices similar to those described above for 1802, 1804, 1806, and 1808.

Although exemplary system environment 1900 is shown with three client computing devices, any number of client computing devices may be supported. Other devices such as devices with sensors, etc. may interact with cloud infrastructure system 1902.

Network(s) 1910 may facilitate communications and exchange of data between client computing devices 1904, 1906, and 1908 and cloud infrastructure system 1902. Each network may be any type of network familiar to those skilled in the art that can support data communications using any of a variety of commercially-available protocols, including those described above for network(s) 1810.

Cloud infrastructure system 1902 may comprise one or more computers and/or servers that may include those described above for server 1812.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1902 may be adapted to automatically provision, manage and track a customer's subscription to services offered by cloud infrastructure system 1902. Cloud infrastructure system 1902 may provide the cloud services via different deployment models. For example, services may be provided under a public cloud model in which cloud infrastructure system 1902 is owned by an organization selling cloud services (e.g., owned by Oracle) and the services are made available to the general public or different industry enterprises. As another example, services may be provided under a private cloud model in which cloud infrastructure system 1902 is operated solely for a single organization and may provide services for one or more entities within the organization. The cloud services may also be provided under a community cloud model in which cloud infrastructure system 1902 and the services provided by cloud infrastructure system 1902 are shared by several organizations in a related community. The cloud services may also be provided under a hybrid cloud model, which is a combination of two or more different models.

In some aspects, the services provided by cloud infrastructure system 1902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1902. Cloud infrastructure system 1902 then performs processing to provide the services in the customer's subscription order.

In some aspects, the services provided by cloud infrastructure system 1902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1902 may also include infrastructure resources 1930 for providing the resources used to provide various services to customers of the cloud infrastructure system. In one aspect, infrastructure resources 1930 may include pre-integrated and optimized combinations of hardware, such as servers, storage, and networking resources to execute the services provided by the PaaS platform and the SaaS platform.

In some aspects, resources in cloud infrastructure system 1902 may be shared by multiple users and dynamically re-allocated per demand. Additionally, resources may be allocated to users in different time zones. For example, cloud infrastructure system 1902 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1932 may be provided that are shared by different components or modules of cloud infrastructure system 1902 and by the services provided by cloud infrastructure system 1902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1902 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1902, and the like.

In one aspect, as depicted in the figure, cloud management functionality may be provided by one or more modules, such as an order management module 1920, an order orchestration module 1922, an order provisioning module 1924, an order management and monitoring module 1926, and an identity management module 1928. These modules may include or be provided using one or more computers and/or servers, which may be general purpose computers, specialized server computers, server farms, server clusters, or any other appropriate arrangement and/or combination.

In exemplary operation 1934, a customer using a client device, such as client computing device 1904, 1906 or 1908, may interact with cloud infrastructure system 1902 by requesting one or more services provided by cloud infrastructure system 1902 and placing an order for a subscription for one or more services offered by cloud infrastructure system 1902. In certain aspects, the customer may access a cloud User Interface (UI), cloud UI 1912, cloud UI 1914 and/or cloud UI 1916 and place a subscription order via these UIs. The order information received by cloud infrastructure system 1902 in response to the customer placing an order may include information identifying the customer and one or more services offered by the cloud infrastructure system 1902 that the customer intends to subscribe to.

After an order has been placed by the customer, the order information is received via the cloud UIs, 1912, 1914 and/or 1916.

At operation 1936, the order is stored in order database 1918. Order database 1918 can be one of several databases operated by cloud infrastructure system 1902 and operated in conjunction with other system elements.

At operation 1938, the order information is forwarded to an order management module 1920. In some instances, order management module 1920 may be configured to perform billing and accounting functions related to the order, such as verifying the order, and upon verification, booking the order.

At operation 1940, information regarding the order is communicated to an order orchestration module 1922. Order orchestration module 1922 may utilize the order information to orchestrate the provisioning of services and resources for the order placed by the customer. In some instances, order orchestration module 1922 may orchestrate the provisioning of resources to support the subscribed services using the services of order provisioning module 1924.

In certain aspects, order orchestration module 1922 enables the management of business processes associated with each order and applies business logic to determine whether an order should proceed to provisioning. At operation 1942, upon receiving an order for a new subscription, order orchestration module 1922 sends a request to order provisioning module 1924 to allocate resources and configure those resources needed to fulfill the subscription order. Order provisioning module 1924 enables the allocation of resources for the services ordered by the customer. Order provisioning module 1924 provides a level of abstraction between the cloud services provided by cloud infrastructure system 1902 and the physical implementation layer that is used to provision the resources for providing the requested services. Order orchestration module 1922 may thus be isolated from implementation details, such as whether or not services and resources are actually provisioned on the fly or pre-provisioned and only allocated/assigned upon request.

At operation 1944, once the services and resources are provisioned, a notification of the provided service may be sent to customers on client computing devices 1904, 1906 and/or 1908 by order provisioning module 1924 of cloud infrastructure system 1902.

At operation 1946, the customer's subscription order may be managed and tracked by an order management and monitoring module 1926. In some instances, order management and monitoring module 1926 may be configured to collect usage statistics for the services in the subscription order, such as the amount of storage used, the amount data transferred, the number of users, and the amount of system up time and system down time.

In certain aspects, cloud infrastructure system 1902 may include an identity management module 1928. Identity management module 1928 may be configured to provide identity services, such as access management and authorization services in cloud infrastructure system 1902. In some aspects, identity management module 1928 may control information about customers who wish to utilize the services provided by cloud infrastructure system 1902. Such information can include information that authenticates the identities of such customers and information that describes which actions those customers are authorized to perform relative to various system resources (e.g., files, directories, applications, communication ports, memory segments, etc.). Identity management module 1928 may also include the management of descriptive information about each customer and about how and by whom that descriptive information can be accessed and modified.

Figure 20:
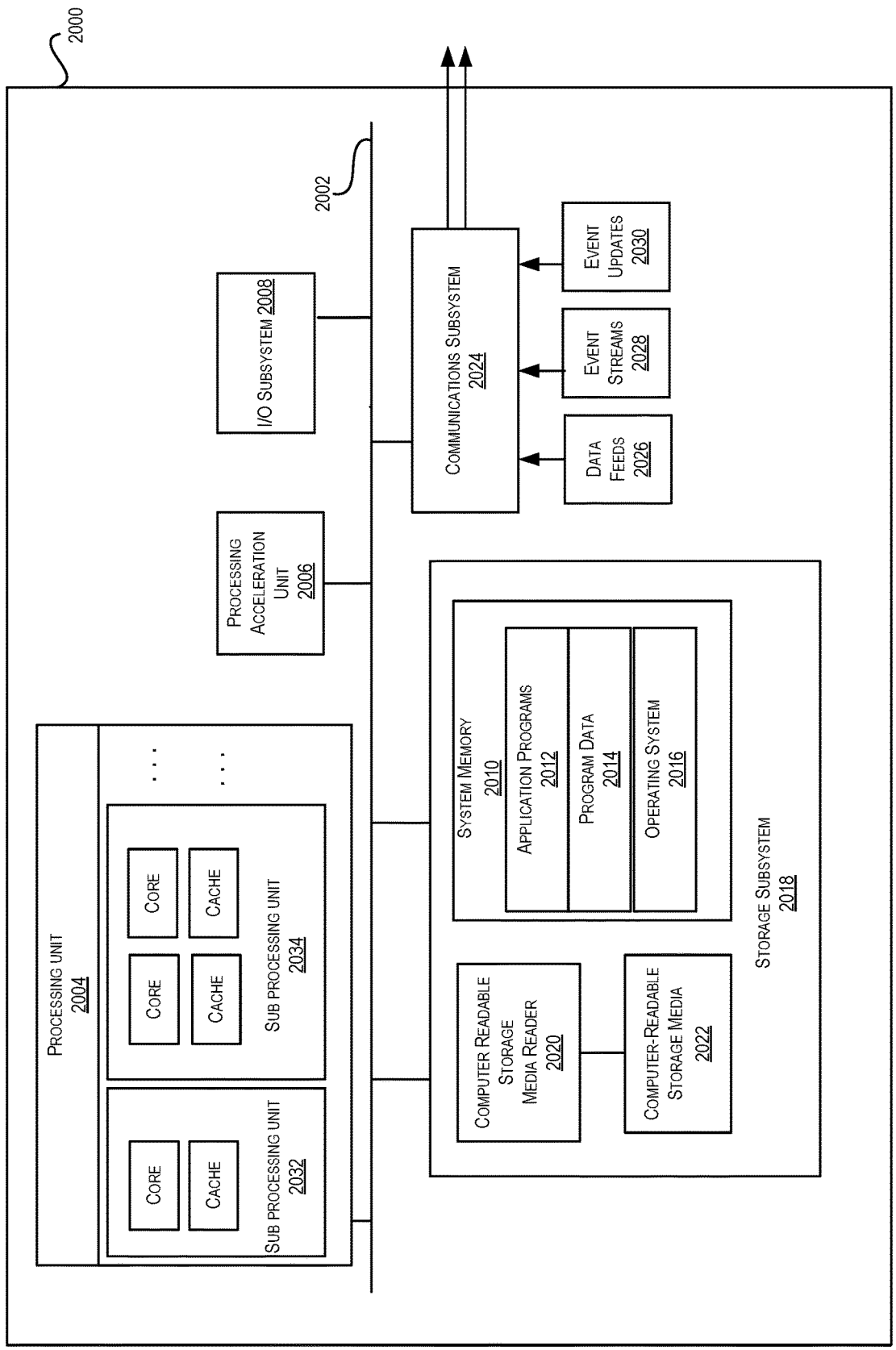
FIG. 20 illustrates an exemplary computer system, in which various aspects of the present invention may be implemented.

FIG. 20 illustrates an exemplary computer system 2000, in which various aspects of the present invention may be implemented. The computer system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative aspects of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2086.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain aspects, processing unit 2004 may be implemented as one or more independent processing units 2032 and/or 2034 with single or multicore processors included in each processing unit. In other aspects, processing unit 2004 may also be implemented as a quad-core processing unit formed by integrating two dual-core processors into a single chip.

In various aspects, processing unit 2004 can execute a variety of programs in response to program code and can maintain multiple concurrently executing programs or processes. At any given time, some or all of the program code to be executed can be resident in processing unit 2004 and/or in storage subsystem 2018. Through suitable programming, processing unit 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2018 may also provide a tangible computer-readable storage medium for storing the basic programming and data constructs that provide the functionality of some aspects. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present invention.

Storage subsystem 2018 may also include a computer-readable storage media reader 2020 that can further be connected to computer-readable storage media 2022. Together and, optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 2000.

By way of example, computer-readable storage media 2022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some aspects, communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.18 family standards, or other mobile communication technologies, or any combination thereof), global positioning system (GPS) receiver components, and/or other components. In some aspects, communications subsystem 2024 can provide wired network connectivity (e.g., Ethernet) in addition to or instead of a wireless interface.

In some aspects, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive unstructured data feeds 2026 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of dialogue management for an autonomous agent, the method comprising:
   clustering a plurality of search results from electronic documents into clusters by identifying pairs of the search results that (i) are separated by a syntactic similarity metric that is less than a first minimum distance and (ii) are separated by a relevance similarity metric that is less than a second minimum distance;
   identifying, a least one cluster of the clusters, a noun phrase that is common between search results in the cluster;
   identifying, from the electronic documents, a question that is relevant to the noun phrase, wherein the identifying comprises:
   constructing a discourse tree from the electronic documents, wherein the discourse tree comprises nodes, each terminal node of the nodes associated with an elementary discourse unit and each nonterminal node of the nodes representing a rhetorical relationship between two of the elementary discourse units wherein each elementary discourse unit comprises contiguous non-overlapping text spans;
   identifying, from the discourse tree, a satellite elementary discourse unit that represents an answer;
   creating, from the answer, a question that is in rhetorical agreement with the answer, wherein the question and the answer form a virtual dialogue; and
   providing the virtual dialogue to a user device.

2. The method of claim 1, wherein the clustering further comprises:
   iteratively, until a threshold number of clusters are obtained:
   identifying a first search result and a second search result that are separated by a minimum distance;
   merging, into a cluster, the first search result and the second search result; and
   determining, for each cluster of the clusters, a topic comprising a noun phrase from a search result associated with the respective cluster.

3. The method of claim 1, wherein the creating comprises:
   identifying a sentence corresponding to the satellite elementary discourse unit;

identifying, within the satellite elementary discourse unit, a word that represents either (i) a noun, (ii) a verb, or (iii) adjective;

replacing, in the sentence, the word with a question word, thereby creating a question; and forming the virtual dialogue by inserting the question immediately preceding the answer.

4. The method of claim 1, wherein the question is relevant to a noun phrase if the question and noun phrase are semantically similar.

5. The method of claim 1, wherein at least one elementary discourse unit of the elementary discourse units associated with each terminal node comprises a verb and one or more words.

6. The method of claim 1, wherein the rhetorical relationship between two of the elementary discourse units logically connects the two elementary discourse units.

7. A non-transitory computer-readable medium storing a set of instructions, the set of instructions comprising:

one or more instructions that, when executed by one or more processors of a computing device, cause the computing device to:

cluster a plurality of search results from electronic documents into clusters by identifying pairs of the search results that (i) are separated by a syntactic similarity metric that is less than a first minimum distance and (ii) are separated by a relevance similarity metric that is less than a second minimum distance;

identify, a least one cluster of the clusters, a noun phrase that is common between search results in the cluster;

identify, from the electronic documents, a question that is relevant to the noun phrase, wherein the identifying comprises:

construct a discourse tree from the electronic documents, wherein the discourse tree comprises nodes, each terminal node of the nodes associated with an elementary discourse unit and each nonterminal node of the nodes representing a rhetorical relationship between two of the elementary discourse units wherein each elementary discourse unit comprises contiguous non-overlapping text spans;

identify, from the discourse tree, a satellite elementary discourse unit that represents an answer;

create, from the answer, a question that is in rhetorical agreement with the answer, wherein the question and the answer form a virtual dialogue; and provide the virtual dialogue to a user device.

8. The non-transitory computer-readable medium of claim 7, wherein the clustering further comprises:

iteratively, until a threshold number of clusters are obtained:

identify a first search result and a second search result that are separated by a minimum distance; and merge, into a cluster, the first search result and the second search result; and determine, for each of the clusters, a topic comprising a noun phrase from a search result associated with the respective cluster.

9. The non-transitory computer-readable medium of claim 7, wherein the creating comprises:

identify a sentence corresponding to the satellite elementary discourse unit;

identify, within the satellite elementary discourse unit, a word that represents either (i) a noun, (ii) a verb, or (iii) adjective;

replace, in the sentence, the word with a question word, thereby creating a question; and form the virtual dialogue by inserting the question immediately preceding the answer.

10. The non-transitory computer-readable medium of claim 7, wherein the question is relevant to a noun phrase if the question and noun phrase are semantically similar.

11. The non-transitory computer-readable medium of claim 7, wherein at least one elementary discourse unit, of the elementary discourse units associated with each terminal node, comprises a verb and one or more words.

12. The non-transitory computer-readable medium of claim 7, wherein the rhetorical relationship between two of the elementary discourse units logically connects the two elementary discourse units.

13. A computing device, comprising:

one or more memories; and one or more processors, communicatively coupled to the one or more memories, configured to:

cluster a plurality of search results from electronic documents into clusters by identifying pairs of the search results that (i) are separated by a syntactic similarity metric that is less than a first minimum distance and (ii) are separated by a relevance similarity metric that is less than a second minimum distance;

identify, a least one cluster of the clusters, a noun phrase that is common between search results in the cluster;

identify, from the electronic documents, a question that is relevant to the noun phrase, wherein the identifying comprises:

construct a discourse tree from the electronic documents, wherein the discourse tree comprises nodes, each terminal node of the nodes associated with an elementary discourse unit and each nonterminal node of the nodes representing a rhetorical relationship between two of the elementary discourse units wherein each elementary discourse unit comprises contiguous non-overlapping text spans;

identify, from the discourse tree, a satellite elementary discourse unit that represents an answer;

create, from the answer, a question that is in rhetorical agreement with the answer, wherein the question and the answer form a virtual dialogue; and provide the virtual dialogue to a user device.

14. The computing device of claim 13, wherein the clustering further comprises:

iteratively, until a threshold number of clusters are obtained:

identify a first search result and a second search result that are separated by a minimum distance; and merge, into a cluster, the first search result and the second search result; and determine, for each of the clusters, a topic comprising a noun phrase from a search result associated with the respective cluster.

15. The computing device of claim 13, wherein the creating comprises:

identify a sentence corresponding to the satellite elementary discourse unit;

identify, within the satellite elementary discourse unit, a word that represents either (i) a noun, (ii) a verb, or (iii) adjective;

replace, in the sentence, the word with a question word, thereby creating a question; and form the virtual dialogue by inserting the question immediately preceding the answer.

16. The computing device of claim 13, wherein the question is relevant to a noun phrase if the question and noun phrase are semantically similar.

17. The computing device of claim 13, wherein at least one elementary discourse unit, of the elementary discourse units associated with each terminal node, comprises a verb and one or more words.

18. The computing device of claim 13, wherein the rhetorical relationship between two of the elementary discourse units logically connects the two elementary discourse units.

* * * * *